US008474286B2

(12) United States Patent
Pitbladdo

(10) Patent No.: US 8,474,286 B2
(45) Date of Patent: Jul. 2, 2013

(54) OVERFLOW DOWNDRAW GLASS FORMING METHOD AND APPARATUS

(75) Inventor: Richard B. Pitbladdo, Naples, FL (US)

(73) Assignee: Corning Incorporated, Corning, NY (US)

( * ) Notice: Subject to any disclaimer, the term of this patent is extended or adjusted under 35 U.S.C. 154(b) by 105 days.

(21) Appl. No.: 13/238,654

(22) Filed: Sep. 21, 2011

(65) Prior Publication Data

US 2012/0006057 A1    Jan. 12, 2012

Related U.S. Application Data

(62) Division of application No. 11/184,212, filed on Jul. 19, 2005, now Pat. No. 8,042,361.

(60) Provisional application No. 60/589,535, filed on Jul. 20, 2004, provisional application No. 60/655,077, filed on Feb. 22, 2005, provisional application No. 60/659,533, filed on Mar. 8, 2005, provisional application No. 60/662,621, filed on Mar. 17, 2005.

(51) Int. Cl.
*C03B 5/26*     (2006.01)
*C03B 17/00*    (2006.01)
*C03B 5/24*     (2006.01)

(52) U.S. Cl.
USPC ............. 65/129; 65/29.17; 65/29.21; 65/126; 65/162; 65/164; 65/326; 65/355; 73/204.23; 73/204.11

(58) Field of Classification Search
USPC .................. 65/325, 326, 327, 324, 355, 126, 65/128, 129, 137, 160, 162, 164, 29.17, 29.19, 65/29.21; 73/861–861.3, 204.11–20
See application file for complete search history.

(56) References Cited

U.S. PATENT DOCUMENTS

| | | | |
|---|---|---|---|
| 1,476,762 A * | 12/1923 | Meyer et al. | 73/204.16 |
| 1,565,319 A | 12/1925 | Fowle | |
| 1,601,513 A * | 9/1926 | Stoekle et al. | 73/204.16 |
| 1,759,229 A | 2/1928 | Drake | |
| 1,673,907 A | 6/1928 | Frengren | |

(Continued)

FOREIGN PATENT DOCUMENTS

| BE | 718111 | 12/1968 |
|---|---|---|
| DE | 1596484 | 7/1967 |

(Continued)

OTHER PUBLICATIONS

JP 2001-080922—English language machine translation—Accessed Feb. 25, 2013 from PAJ.*

(Continued)

*Primary Examiner* — Jason L. Lazorcik
(74) *Attorney, Agent, or Firm* — Thomas R. Beall

(57) ABSTRACT

The present invention significantly modifies "The Overflow Process". It includes a method and apparatus for measuring glass flow rate and maintaining a constant glass flow rate. It also embodies design features and methods that support and stress the forming apparatus in a manner such that the deformation that results from thermal creep is corrected, thus minimizing the effect of the thermal creep on the thickness variation of the glass sheet. The present invention also embodies design features that change the process from a single step (combined flow distribution and cooling) to a two step process; step one being flow distribution and step two being cooling.

14 Claims, 25 Drawing Sheets

U.S. PATENT DOCUMENTS

| | | | |
|---|---|---|---|
| 1,697,227 A | 1/1929 | Danner | |
| 1,731,260 A | 10/1929 | Nobbe | |
| 1,829,639 A | 10/1931 | Ferngren | |
| 1,829,641 A | 10/1931 | Ferngren | |
| 1,841,579 A | 1/1932 | Fraser | |
| 1,891,370 A | 12/1932 | Danner | |
| 2,679,749 A * | 6/1954 | Poole | 73/54.01 |
| 2,729,976 A * | 1/1956 | Laub | 73/204.16 |
| 2,813,237 A * | 11/1957 | Fiuegel et al. | 318/663 |
| 2,972,885 A * | 2/1961 | Laub | 73/204.14 |
| 3,056,295 A * | 10/1962 | Laub | 73/204.16 |
| 3,149,949 A | 9/1964 | Dockerty et al. | 65/53 |
| 3,236,099 A * | 2/1966 | Warthen | 73/204.13 |
| 3,324,721 A * | 6/1967 | Warthen | 73/204.13 |
| 3,338,696 A | 8/1967 | Dockerty | 65/145 |
| 3,433,613 A | 3/1969 | Dockerty | 65/145 |
| 3,437,470 A | 4/1969 | Overman | 65/195 |
| 3,451,798 A | 6/1969 | Simon | 65/199 |
| 3,506,429 A | 4/1970 | Overman | 65/203 |
| 3,519,411 A | 7/1970 | Cortright et. al. | 65/90 |
| 3,589,887 A | 6/1971 | Ward | 65/195 |
| 3,607,182 A | 9/1971 | Leibowitz | 65/66 |
| 3,682,609 A | 8/1972 | Dockerty | 65/83 |
| 3,723,082 A | 3/1973 | Knowles et al. | 65/84 |
| 4,214,886 A | 7/1980 | Shay et al. | 62/121 |
| 4,389,725 A | 6/1983 | Barkhau et al. | |
| 4,416,678 A | 11/1983 | Bottger | 65/2 |
| 4,426,217 A * | 1/1984 | Farrar et al. | 65/135.8 |
| 4,549,895 A * | 10/1985 | Izumitani et al. | 65/29.21 |
| 4,737,178 A * | 4/1988 | Reifschneider et al. | 65/384 |
| 4,738,706 A | 4/1988 | Picinelli | |
| 5,374,595 A | 12/1994 | Dumbaugh, Jr. et al. | 501/66 |
| 6,319,867 B1 | 11/2001 | Chacon et al. | 501/66 |
| 6,748,765 B2 | 6/2004 | Pitbladdo | |
| 6,889,526 B2 | 5/2005 | Pitbladdo | |
| 6,895,782 B2 | 5/2005 | Pitbladdo | |
| 6,974,786 B2 | 12/2005 | Helfinstine et al. | |
| 6,990,834 B2 | 1/2006 | Pitbladdo | |
| 6,997,017 B2 | 2/2006 | Pitbladdo | |
| 7,155,935 B2 | 1/2007 | Pitbladdo | |
| 2003/0029199 A1 | 2/2003 | Pitbladdo | 65/195 |
| 2003/0110804 A1 | 6/2003 | Fenn et al. | 65/90 |
| 2003/0192349 A1 | 10/2003 | Meda et al. | 65/53 |
| 2004/0138043 A1* | 7/2004 | Kasuga et al. | 501/45 |
| 2005/0183455 A1 | 8/2005 | Pitbladdo | |

FOREIGN PATENT DOCUMENTS

| | | |
|---|---|---|
| DE | 1596402 | 12/1967 |
| DE | 1596403 | 12/1967 |
| DE | 21 58 253 | 11/1971 |
| DE | 3113505 | 1/1983 |
| DE | 31 11484 A1 | 2/1983 |
| DE | 33 16795 | 11/1983 |
| DE | 31 11484 C2 | 12/1983 |
| DE | 33 14540 | 12/1983 |
| DE | 3329843 | 5/1984 |
| DE | 3507852 | 8/1985 |
| DE | 3518137 | 1/1986 |
| DE | 43 36 046 | 10/1993 |
| DE | 43 26 143 | 12/1993 |
| DE | 196 44 673 | 4/1998 |
| DE | 198 09 878 | 9/1999 |
| DE | 198 40 113 | 3/2000 |
| DE | 19964043 | 7/2001 |
| DE | 100 21 013 | 11/2001 |
| DE | 100 28 741 | 12/2001 |
| FR | 1549081 | 12/1967 |
| FR | 1549915 | 1/1968 |
| GB | 982153 | 2/1965 |
| GB | 1200401 | 7/1970 |
| GB | 1354006 | 6/1974 |
| JP | 09110443 | 4/1997 |
| JP | 10291827 | 11/1998 |
| JP | 11-246230 | 9/1999 |
| JP | 2001-80922 | 9/1999 |
| JP | 2001080922 A * | 3/2001 |

OTHER PUBLICATIONS

Varshneya, Arun, "Fundamentals of Inorganic Glasses", Academic Press, Inc., 1994, pp. 534-540.

Snyder, R.D./Byars, E.F., "Engineering Mechanics", McGraw-Hill Book Company, 1973, pp. 349-350.

Kingery, W.D.; Bowen, H.K.; Uhlmann, D.R., "Introduction to Ceramics", John Wiley & Sons, 1976, pp. 705-767.

Bottger, et al.; "LCD substrate—the future process" International Glass Review, Issue 2—2000; 3 pages.

Bocko, Peter L. and Mitchell, Mark H. "AMLCD Glass Substrates—Foundation for High-Tech Displays" The GlassReseacher, vol. 12, No. 1, pp. 26-29, 2002.

* cited by examiner

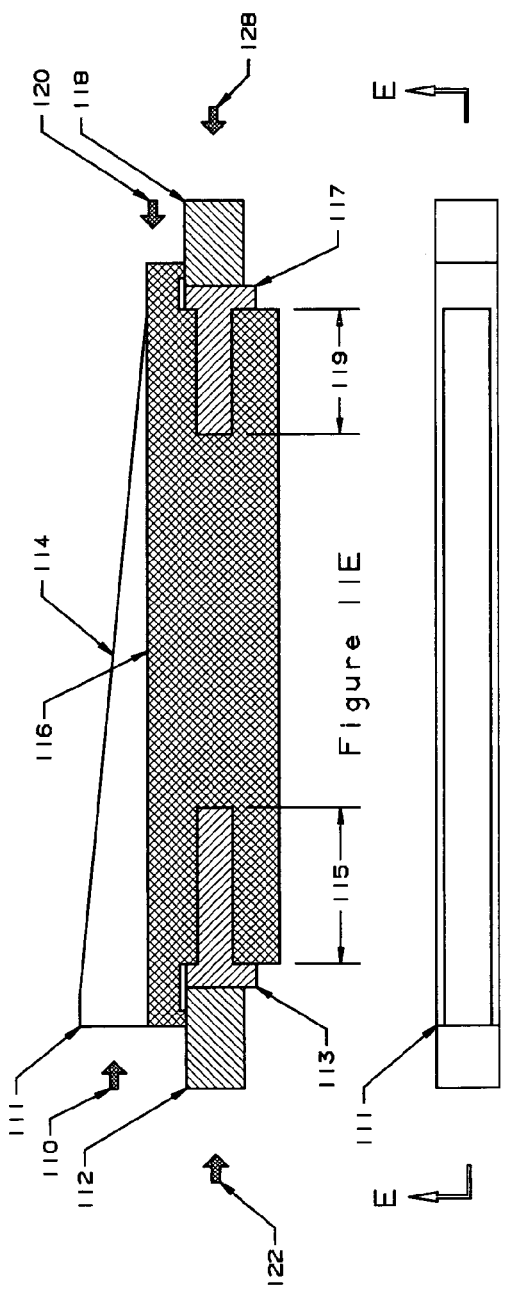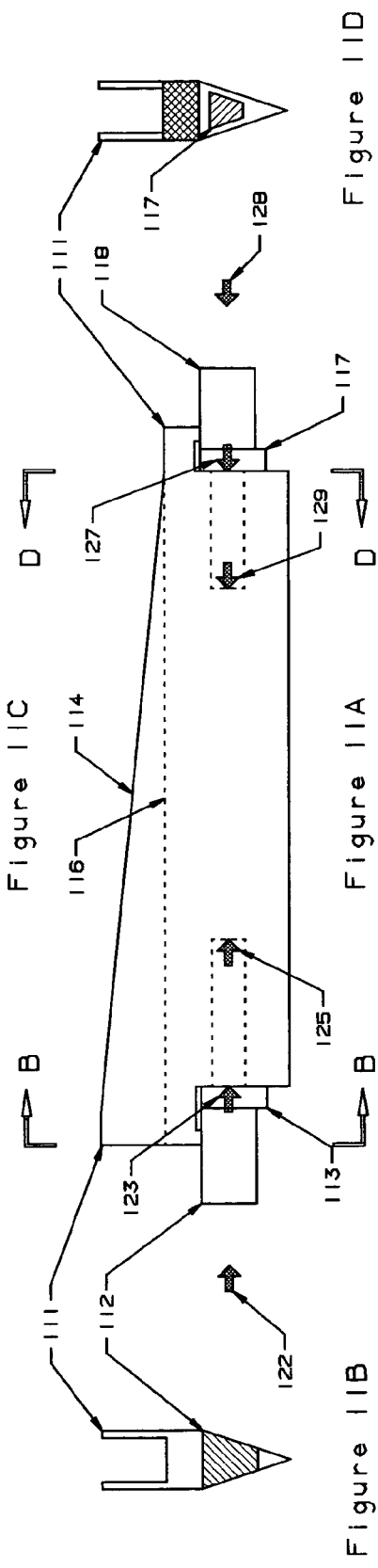

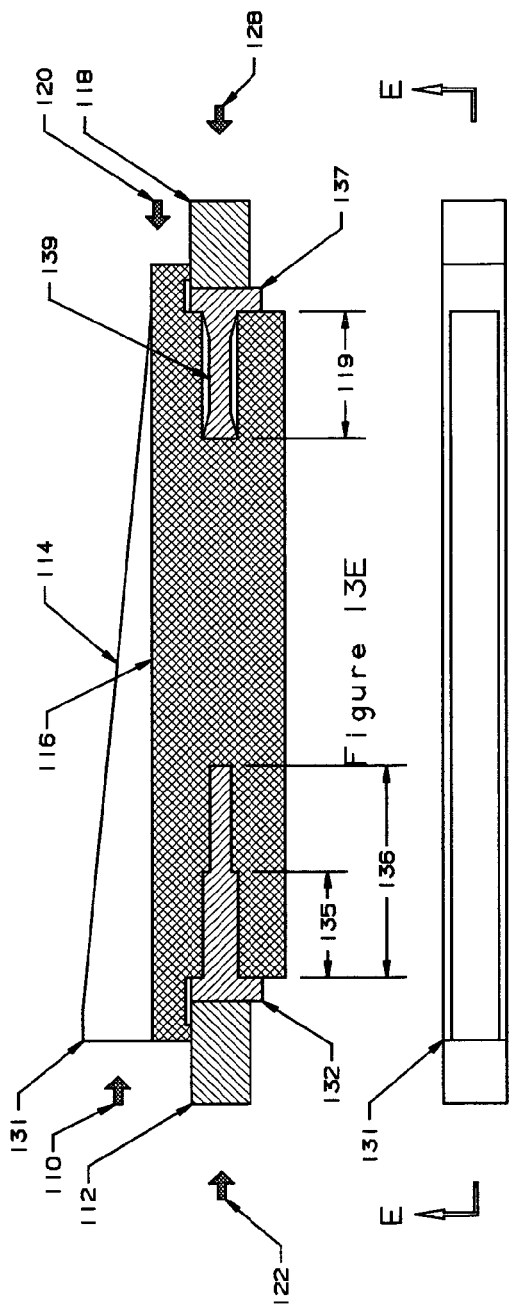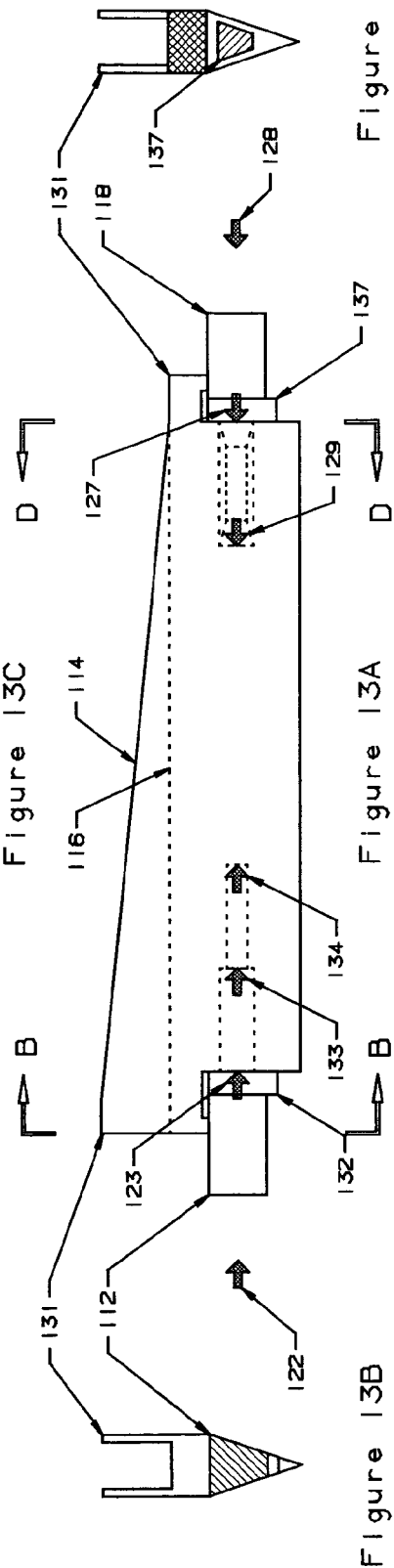

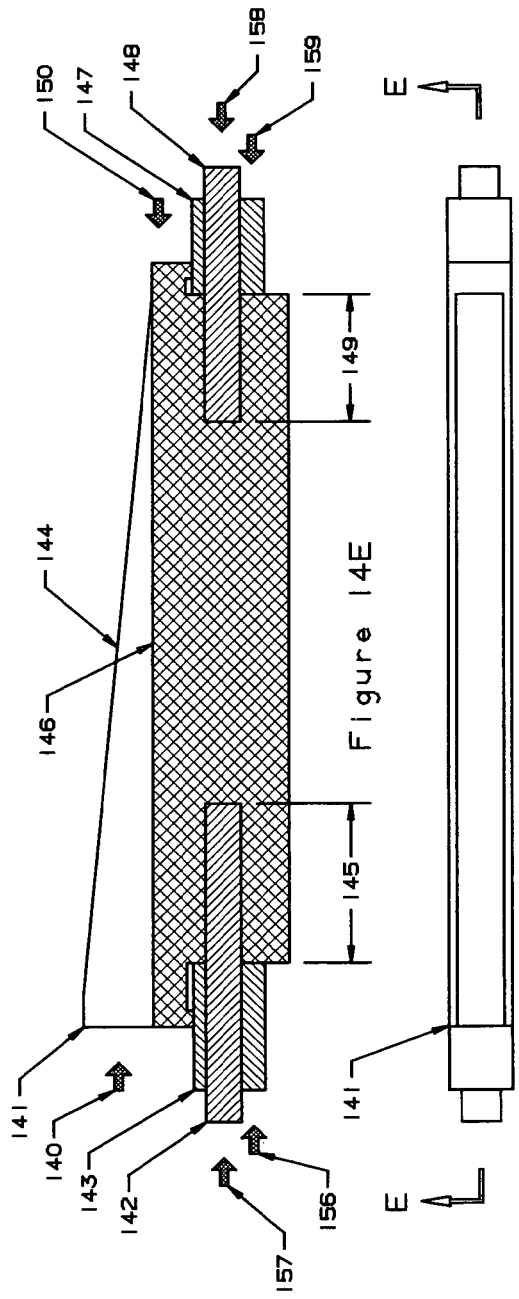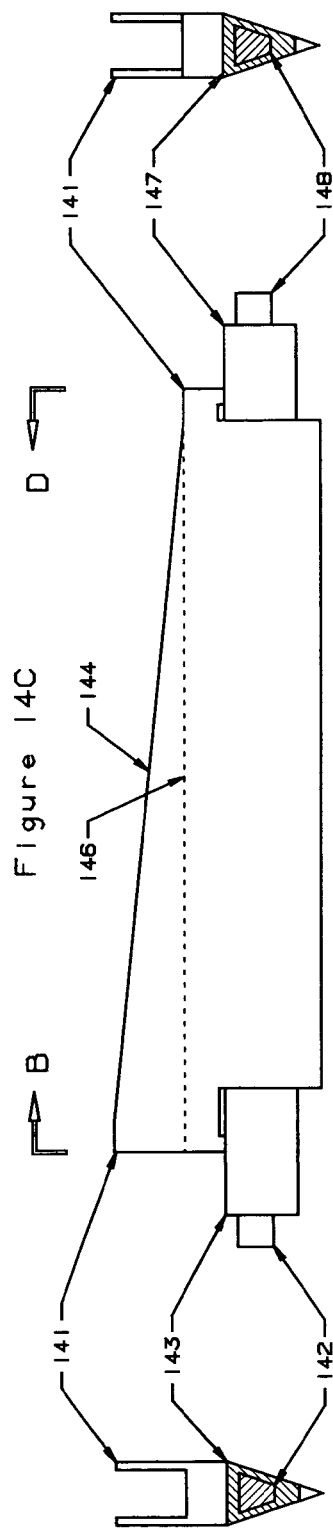

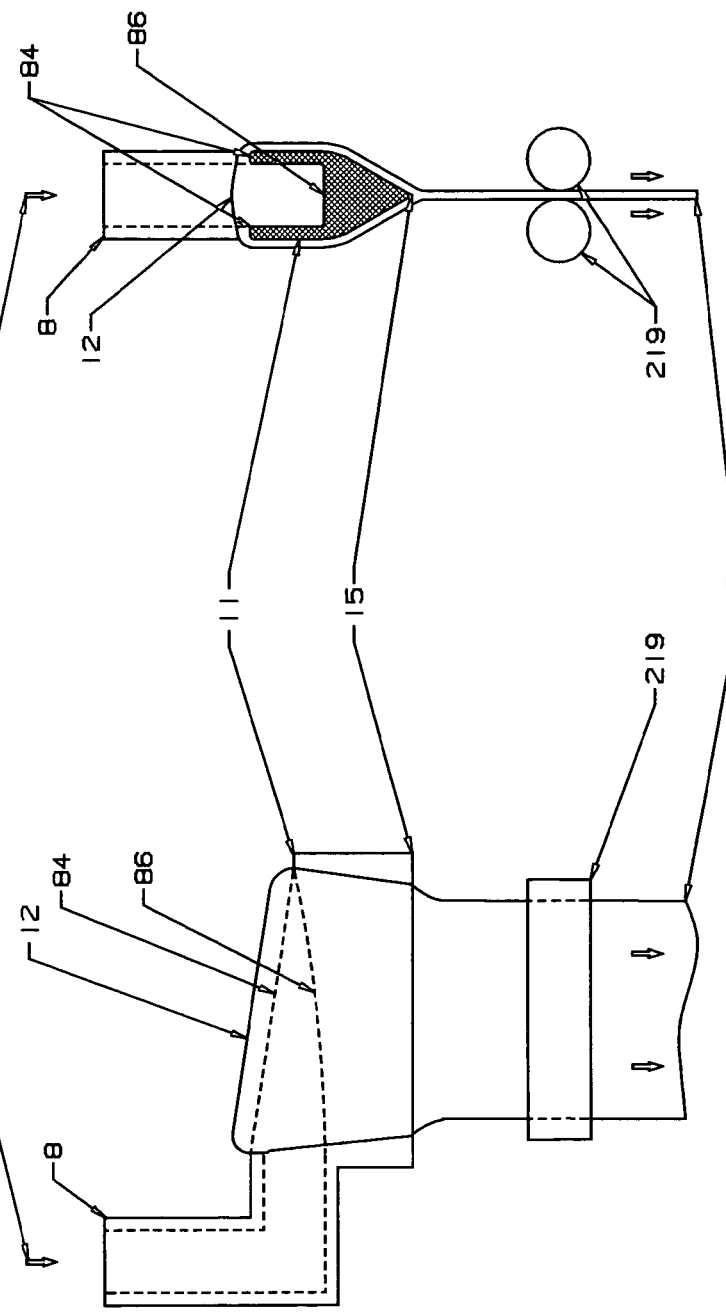

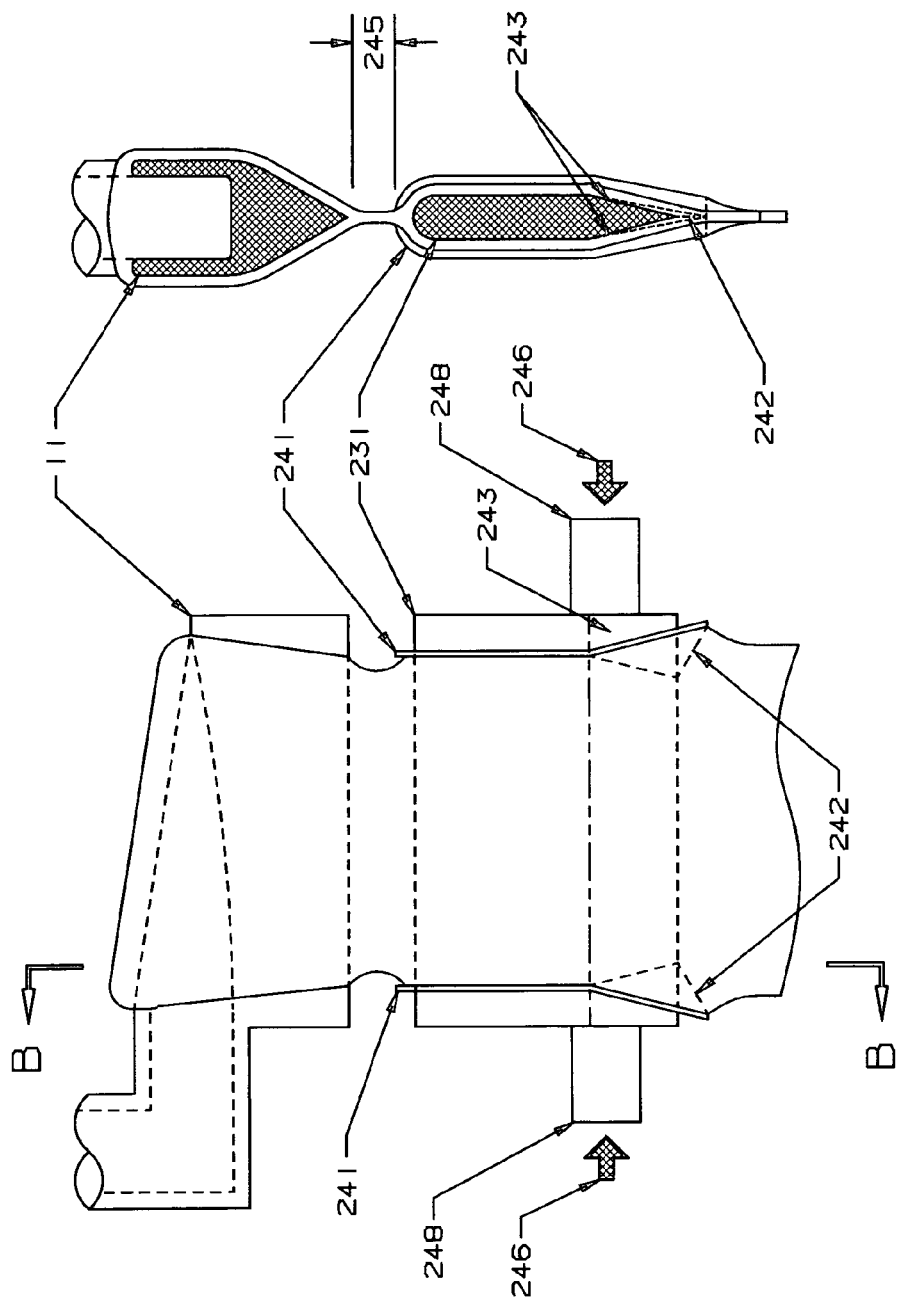

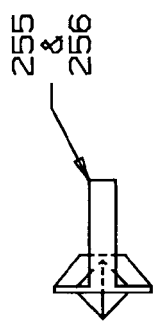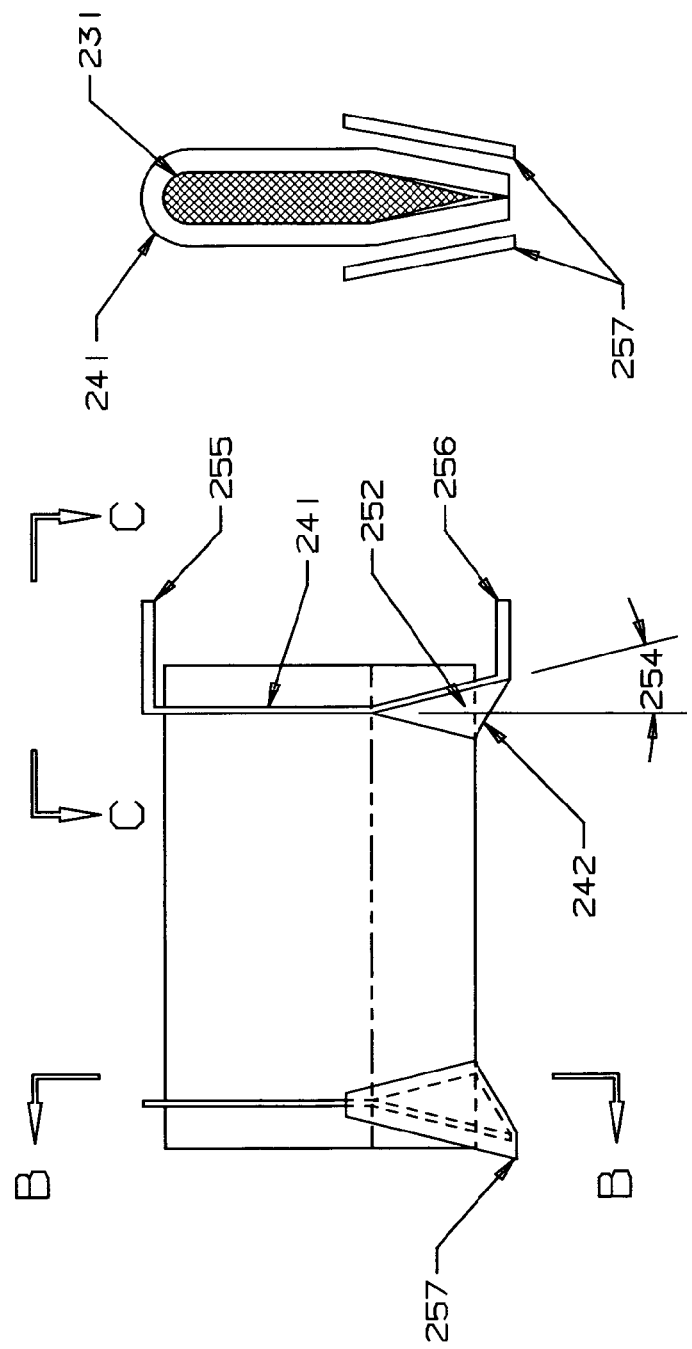
Figure 25A
Figure 25B
Figure 25C

OVERFLOW DOWNDRAW GLASS FORMING METHOD AND APPARATUS

REFERENCE TO RELATED APPLICATIONS

This application is a divisional application of U.S. patent Ser. No. 11,184,212 entitled "OVERFLOW DOWNDRAW GLASS FORMING METHOD AND APPARATUS" and filed on Jul. 19, 2005, now U.S. Pat. No. 8,042,361 the content of all of which is hereby incorporated by reference in its entirety.

This application and its parent application, U.S. patent application Ser. No. 11/184,212 identified above claim an invention, which was disclosed in the following Provisional Applications:
1) Provisional Application No. 60/589,535, filed Jul. 20, 2004, entitled "GLASS FLOW RATE CONTROL FOR SHEET GLASS FORMING APPARATUS";
2) Provisional Application No. 60/655,077, filed Feb. 22, 2005, entitled "SHEET GLASS FORMING APPARATUS";
3) Provisional Application No. 60/659,533, filed Mar. 8, 2005, entitled "METHOD AND APPARATUS FOR OVERFLOW DOWNDRAW PROCESS GLASS SHEET THICKNESS CONTROL"; and
4) Provisional Application No. 60/662,621, filed Mar. 17, 2005, entitled "METHOD AND APPARATUS FOR OVERFLOW DOWNDRAW PROCESS".

The benefit under 35 USC §119(e) of the United States provisional applications is hereby claimed, and the aforementioned applications are hereby incorporated herein by reference.

BACKGROUND OF THE INVENTION

1. Field of the Invention

The invention pertains generally to the manufacture of glass sheets, and, more particularly, to glass sheets formed from an overflow process.

2. Description of Related Art

The glass that is used for semiconductor powered display applications, particularly for TFT/LCD display devices that are widely used for computer displays, must have very high surface quality to allow the successful application of semiconductor type material. Sheet glass made using the apparatus of U.S. Pat. No. 3,338,696, assigned to Corning, Inc., makes the highest quality glass as formed and does not require post-processing. That patent makes glass by a manufacturing process termed "The Overflow Process". Glass made using other processes requires grinding and/or polishing and thus does not have as fine a surface finish. The glass sheet must also conform to stringent thickness variation and warp specifications. The fine surface finish is formed from virgin glass primarily from the center of the glass stream. This glass has not been in contact with foreign surfaces since the stirring operation.

The teachings of U.S. Pat. No. 3,338,696 are still the state of the art as practiced today; however, the apparatus has limitations.

A drawback of the apparatus of "The Overflow Process" is that, even though it makes excellent glass during stable operating conditions, the control of process temperature and flow is limited by simplistic control technology, thus allowing unintended process transients which cause glass defects. Defects caused by the flow and temperature transients eventually subside when the process stabilizes; however, there is a period of time where the quality of the glass sheet is substandard. Flow and temperature transients also cause variations in the sheet thickness. Therefore, there is a need in the art for measurement technology that facilitates more precise control of the flow rate of the glass entering the forming apparatus.

Another drawback of the apparatus of "The Overflow Process" is that the forming apparatus deforms during a manufacturing campaign in a manner such that the glass sheet no longer meets the thickness specification. This is a primary cause for premature termination of the production run. Therefore, there is a need in the art for technology that corrects for the apparatus deformation.

Another drawback of the apparatus of "The Overflow Process" is that the production rate of the present forming apparatus design is limited by the use of a single step process to both distribute the glass and cool the glass prior to drawing the sheet. The limited production rate makes the cost of the glass sheet that is produced less competitive in the market.

SUMMARY OF THE INVENTION

The present invention significantly modifies "The Overflow Process". It includes a method and apparatus for measuring glass flow rate and maintaining a constant glass flow rate. It also embodies design features and methods that support and stress the forming apparatus in a manner such that the deformation that results from thermal creep is corrected, thus minimizing the effect of the thermal creep on the thickness variation of the glass sheet. The present invention also embodies design features that change the process from a single step (combined flow distribution and cooling) to a two step process; step one being flow distribution and step two being cooling.

BRIEF DESCRIPTION OF THE DRAWINGS

FIG. 11A is a side view of an embodiment of the present invention that shows compression loading of the trough bottom, which is applied by compression inserts inserted into cavities at each end of the forming block.

FIG. 11B is a cross-section of the forming block shown in FIG. 11A across lines B-B.

FIG. 11C is a top view of the embodiment shown in FIG. 11A.

FIG. 11D is a cross-section of the forming block shown in FIG. 11A across lines D-D.

FIG. 11E is a cross-section of the embodiment shown in FIG. 11C across lines E-E that shows multi-stage compression loading of the trough bottom.

FIG. 13A is a side view of an embodiment of the present invention that shows multi-stage compression loading of the trough bottom, which is applied by compression blocks inserted into cavities at each end of the forming block.

FIG. 13B is a cross-section of the forming block shown in FIG. 13A across lines B-B.

FIG. 13C is a top view of the embodiment shown in FIG. 13A.

FIG. 13D is a cross-section of the forming block shown in FIG. 13A across lines D-D.

FIG. 13E is a cross-section of the embodiment shown in FIG. 13C across lines E-E that shows multi-stage compression loading of the trough bottom.

FIG. 14A is a side view of another embodiment of the present invention that shows two stage compression loading of the trough bottom.

FIG. 14B is a cross-section of the forming block shown in FIG. 14A across lines B-B.

FIG. 14C is a top view of the embodiment shown in FIG. 14A.

FIG. 14D is a cross-section of the forming block shown in FIG. 14A across lines D-D.

FIG. 14E is a cross-section of the embodiment shown in FIG. 14C across lines E-E that shows multi-stage compression loading of the trough bottom.

FIG. 21A is a side view of the prior art glass forming block.

FIG. 21B is an end view of the prior art glass forming block.

FIG. 24A is a side view of the two step forming process showing cooling block compression loading and glass flow in an embodiment of the present invention.

FIG. 24B is an end view of the two step forming process shown in FIG. 24A.

FIG. 25A is a side view of a cooling block in the two step forming process showing two methods of edge director heating in an embodiment of the present invention.

FIG. 25B is an end view of the cooling block in FIG. 25A showing one method of edge director heating in an embodiment of the present invention.

FIG. 25C is a top view of the edge director in FIG. 25A showing one method of edge director heating in an embodiment of the present invention.

DETAILED DESCRIPTION OF THE INVENTION

Figure 1:
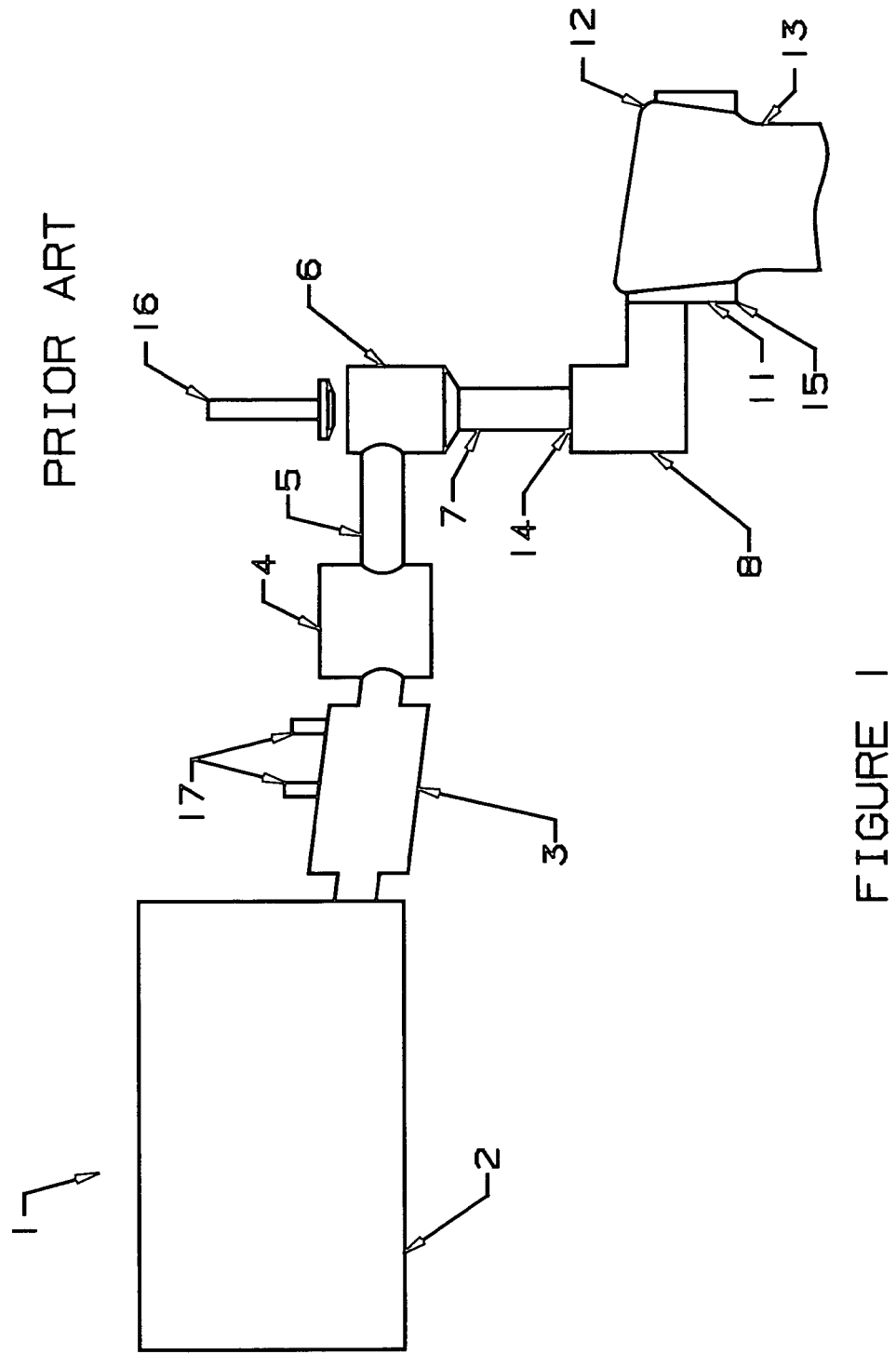
FIG. 1 shows the principle parts of "The Overflow Process" sheet glass manufacturing system.

The present invention provides technology for measurement of glass flow rate as it enters the forming apparatus of the sheet manufacturing process and discloses a procedure for regulating this process flow. As presently practiced in the prior art, the measurement of glass flow rate is determined by the quantity of the product produced at the end of the production line. The present invention incorporates energy balance information and preferably uses representative measurements of the glass stream temperature as outlined in U.S. Pat. No. 6,895,782 and patent application Ser. No. 11/011,657, as contrasted with prior art measurements of the temperature of the outer surface of the process piping.

The glass "Sheet Forming Apparatus" normally designed for use in "The Overflow Process" (U.S. Pat. No. 3,338,696) relies on a specifically shaped forming block to distribute the glass in a manner to form sheet of a uniform thickness. The basic shape of this forming block is described in detail in U.S. Pat. No. 3,338,696. The sheet glass forming process is conducted at elevated temperatures, typically between 1000° C. and 1350° C. At these temperatures the materials used for construction of the forming block exhibit a property called thermal creep, which is deformation of the material caused by applied stress at elevated temperatures. Thus, the forming block sags and deforms under the stress caused by its own weight and the stress caused by the hydrostatic pressure of the glass in the forming block trough. In the prior art a counteracting force is introduced at each end of the forming block to prevent the forming block sag. This force, however, cannot fully correct for the distributed force introduced by the weight of the forming block, thus the thickness distribution of the glass sheet manufactured is not fully corrected.

This invention introduces a method for using either the prior art force device or a multi-stage force device to further minimize the distortion of the forming block trough and weirs when the forming block changes shape under the influence of thermal creep.

In the prior art "Overflow Process" the glass flows into the top portion of the one piece forming block at a viscosity of approximately 25,000 poise, flows over the forming block weirs and down the sides of the forming block, where it is cooled to the drawing viscosity of approximately 100,000 poise. This represents a cooling of the glass of approximately 75° C. The range of cooling is limited by the vertical dimension of the forming block. The cooling range could be increased to 100-200° C. if the forming block were vertically larger, however, current refractory manufacturing technology limits the size of the forming block.

The present invention isolates the forming block in a separate chamber at a much higher temperature. This allows the glass to be at a significantly lower viscosity, thus allowing a greater glass flow in the same size forming block. The glass is then fed to a cooling block in a separate chamber. This chamber has a large vertical dimension such that the glass can be cooled to the temperature required by the forming viscosity of approximately 100,000 poise.

The molten glass flow from the melting furnace and forehearth, which is preferably of substantially uniform temperature, chemical composition and flow rate, enters the forming apparatus through the inlet pipe to the sheet forming trough. The glass sheet forming apparatus is described in detail in U.S. Pat. No. 3,338,696 entitled "SHEET FORMING APPARATUS", issued Aug. 29, 1967, U.S. Pat. No. 6,748,765 entitled "OVERFLOW DOWNDRAW GLASS FORMING METHOD AND APPARATUS", issued Jun. 15, 2004, U.S. Pat. No. 6,889,526 entitled "OVERFLOW DOWNDRAW GLASS FORMING METHOD AND APPARATUS", issued May 10, 2005, U.S. Pat. No. 6,895,782 entitled "OVERFLOW DOWNDRAW GLASS FORMING METHOD AND APPARATUS", issued May 24, 2005, patent application Ser. No. 10/826,097 entitled "SHEET GLASS FORMING APPARATUS", filed Apr. 16, 2004, patent application Ser. No. 11/006,251 entitled "SHEET GLASS FORMING APPARATUS", filed Dec. 7, 2004, patent application Ser. No. 11/011,657 entitled "SHEET GLASS FORMING APPARATUS, filed Dec. 14, 2004, and patent application Ser. No. 11/060,139 entitled "SHEET WIDTH CONTROL FOR OVERFLOW DOWNDRAW SHEET FORMING APPARATUS", filed Feb. 17, 2005. All of these U.S. patents and patent applications are herein incorporated by reference.

Referring to FIG. 1, a typical "Overflow Process" manufacturing system (1) is shown. The glass (12) from the melting furnace (2) and finer (3), which must be of substantially uniform temperature and chemical composition, feeds a stirrer (4). The stirrer (4) thoroughly homogenizes the glass. The glass (12) is then conducted through a cooling pipe (5), into a bowl (6), and down into the downcomer pipe (7), through the joint (14) between the downcomer pipe (7) and the forming apparatus inflow pipe (8), to the inlet of the overflow forming block (11). While flowing from the stirrer (4) to the forming block (11), the glass (12), especially that which forms the sheet surface, must remain homogeneous. The bowl (6) alters the flow direction from horizontal to vertical and in some applications provides a means for stopping the flow of glass (12). A needle (16) is provided to stop glass flow. The normal function of the downcomer pipe (7) is twofold. It conducts the glass from the bowl (6) to the trough inflow pipe (8) and controls the flow rate of the glass stream entering the process. The downcomer pipe (7) is carefully designed such that by maintaining it at a specific temperature the desired glass stream flow rate is precisely maintained at the desired value.

The joint (14) between the downcomer pipe (7) and the trough inflow pipe (8) allows for removal of the sheet glass forming apparatus for service and compensations for the thermal expansion of the process equipment.

The Reynolds number is the ratio of inertial forces to viscous forces and is used to determine whether a flow is laminar or turbulent. Laminar flow occurs at low Reynolds numbers and turbulent flow occurs at high Reynolds numbers. Glass is a Newtonian fluid and its flow is laminar. Typical Reynolds Numbers are many orders of magnitude below a Reynolds Number of 1000, which is the rule of thumb for transition from laminar flow to turbulent flow. Laminar flow is characterized by the flow rate being controlled by the viscosity of the flowing medium and all particles following uniform predictable paths; whereby there is no mixing in the flow stream. The viscosity of glass, however, is a very strong function of temperature. Therefore, it is important to accurately control the temperature of the glass to control the flow rate of the glass.

The downcomer pipe (7) is the primary glass flow control device for the forming block (11). The downcomer pipe (7) is dynamically matched to the forming block (11) design to produce glass of the required thickness profile. Prior art operation recommends operating both at the same constant temperature. This is recommended because the downcomer pipe (7) and the forming block (11) are oil modeled with constant temperature oil as a unit to certify the design prior to construction.

Figure 2:
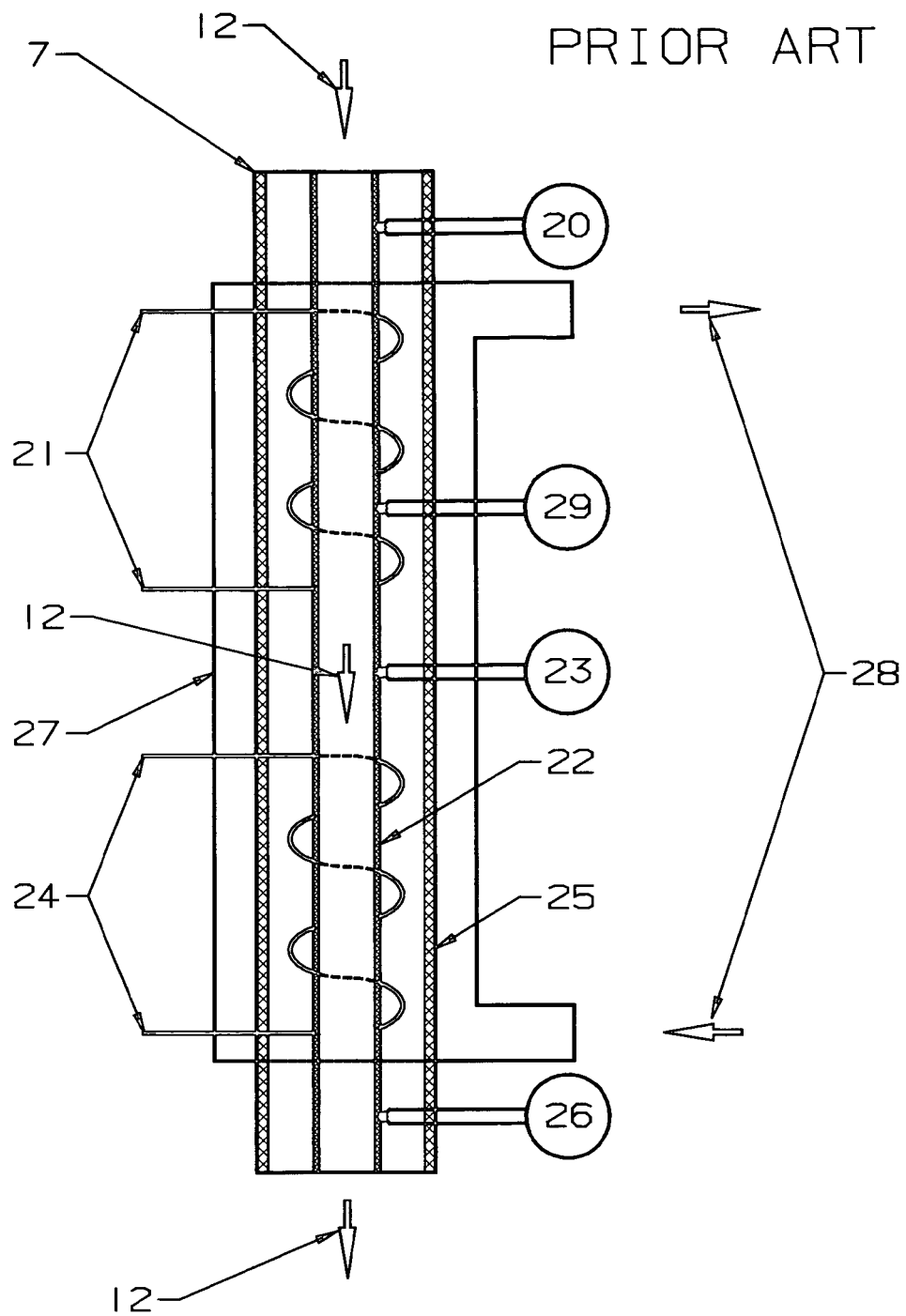
FIG. 2 shows a prior art heated downcomer pipe with two zones of temperature control.

FIG. 2 shows the prior art downcomer pipe (7) system. The glass (12) flows through the platinum pipe (22), which is heated by one or more electric heating elements (21) and (24). Heat loss to the environment is limited by the insulation jacket (25). A cooling jacket (27), through which cooling gases (28) flow, often encases the system. The power of the heating elements (21) and (24), the thickness of the insulation jacket (25), and the quantity of cooling gases (28) determine the range of operation for the glass flow (12) through the downcomer pipe (7) system. The flow rate of the glass (12) is primarily controlled by the power in the heating elements.

The thermocouples (20), (23), (26), and (29) are representative of common practice in the prior art as they are shown touching the outside surface of the platinum pipe (22) containing the flowing glass. Measurement of the temperature of the outside surface of the platinum pipe is the preferred practice in the prior art, and thermocouples have been mounted accordingly. It is common to control the temperature of the flowing glass to a predetermined level by maintaining the readings of the thermocouples constant. Typically the power to the heating element (21) would be regulated to maintain the temperature at location (23) constant as measured by thermocouple (23), and the power to the heating element (24) would be regulated to maintain the temperature at location (26) constant as measured by thermocouple (26). Another procedure practiced in the prior art uses the reading of thermocouple (29) to control the power in the heating element (21).

Measurement and Control of Glass Flow Rate

In an embodiment of the present invention, the temperature of the molten glass stream is accurately measured at two or more different points along the downcomer pipe. Further, heat flow is carefully controlled by heating elements and optional cooling jackets at multiple locations along the downcomer pipe. Finally, a controlled and constant glass flow rate is maintained by use of the equations derived in this application from energy balance equations on the system.

The operating parameters that determine the glass flow rate are the viscosity of the glass stream and the available static pressure. If the process has a free surface in the bowl, the level of glass in the bowl determines the static pressure available for flow. If the bowl has a sealed top, the static pressure available to flow the glass is determined by the operating conditions in the other parts of the system extending back to and including the stirrer (4). The viscosity of the glass is a function of the glass chemistry and the glass temperature. The chemistry varies considerably; however, this occurs over a fairly long time period and does not affect the minute to minute flow variations. The glass viscosity is inferred by the measurement of glass temperature. Note that the measurement of the temperature of the outside of the platinum pipe (22) is not representative of the average viscosity of the glass stream and is therefore a potential source of error. It is preferable to use thermocouples inserted into the glass stream which give a representative measurement of the glass stream temperature as outlined in U.S. Pat. No. 6,895,782 and patent application Ser. No. 11/011,657.

The following derivation produces the equations used in embodiments of the present invention to maintain a constant glass flow rate during the glass forming process, thereby producing sheet glass of a constant thickness. The derivation also produces the equations used to set the flow rate of the glass during the glass forming process in embodiments of the present invention, thereby producing sheet glass of a desired thickness. The derivation is based on four assumptions, which are discussed in further detail following the derivation.

Figure 3:
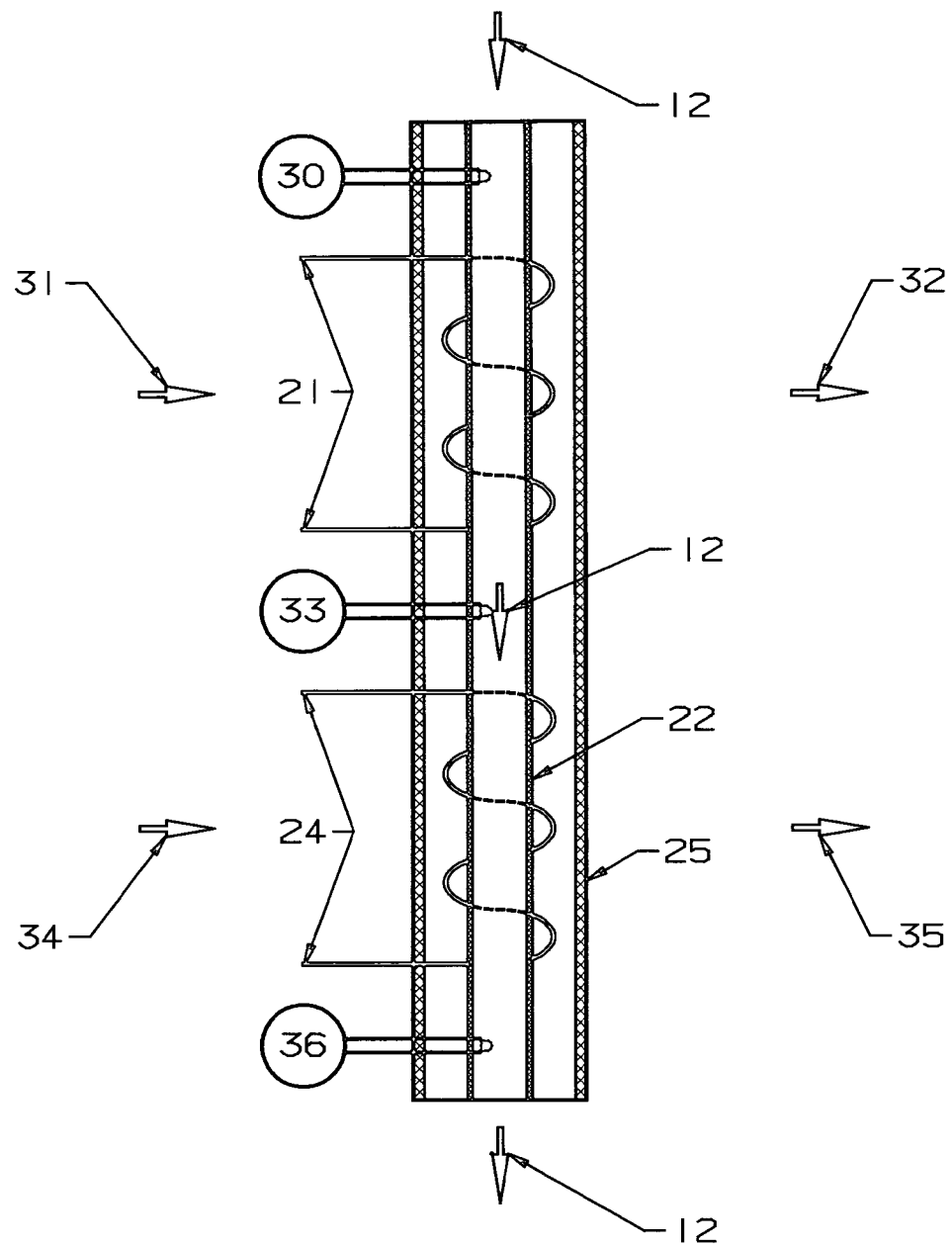
FIG. 3 shows a heated downcomer pipe with two zones of temperature control in an embodiment of the present invention.

Referring to FIG. 3 the equations for the heat flow Q in the downcomer pipe (7) are:

$$Q_{30}=w_g \times c \times T_{30} \qquad \text{Eq. (1)}$$

$$Q_{31}=\text{Electric Power at (31)} \qquad \text{Eq. (2)}$$

$$Q_{32}=h_{32} \times A \times (T_{32}-T_{amb}) + \epsilon_{32} \times \sigma \times A \times (T_{32}^4-T_{amb}^4) \qquad \text{Eq. (3)}$$

$$Q_{33}=w_g \times c \times T_{33} \qquad \text{Eq. (4)}$$

$$Q_{34}=\text{Electric Power at (34)} \qquad \text{Eq. (5)}$$

$$Q_{35}=h_{35} \times A \times (T_{35}-T_{amb}) + \epsilon_{35} \times \sigma \times A \times (T_{35}^4-T_{amb}^4) \qquad \text{Eq. (6)}$$

$$Q_{36}=w_g \times c \times T_{36} \qquad \text{Eq. (7)}$$

where:
$w_g$=glass (12) flow rate
c=glass specific heat, assumed constant, therefore d(c)=0
T=temperature
h=convection heat transfer coefficient, assumed constant, therefore d(h)=0
$\epsilon$=emissivity, assumed constant, therefore d($\epsilon$)=0
$\sigma$=Stefan-Boltzmann constant
A=surface area for heat transfer Heat (31) and (34) is added to the glass by the heating elements (21) and (24), and heat (32) and (35) is lost to the ambient (amb) environment along the downcomer pipe. Writing the energy balance equations:

$$Q_{33}=Q_{30}+Q_{31}-Q_{32} \qquad \text{Eq. (8)}$$

$$Q_{36}=Q_{33}+Q_{34}-Q_{35} \qquad \text{Eq. (9)}$$

Substituting Eq. (8) into Eq. (9) and transposing produces:

$$Q_{36}-Q_{30}=(Q_{31}+Q_{34})-(Q_{32}+Q_{35}) \qquad \text{Eq. (10)}$$

Substituting Eq. (1) and Eq. (7) into Eq. (10):

$$w_g \times c \times (T_{36}-T_{30})=Q_{31}+Q_{34}-(Q_{32}+Q_{35}) \qquad \text{Eq. (11)}$$

Taking the derivative of Eq. (11):

$$w_g \times c \times d(T_{36}-T_{30})+d(w_g) \times c \times (T_{36}-T_{30})=d(Q_{31})+d(Q_{34})-d(Q_{32}+Q_{35}) \qquad \text{Eq. (12)}$$

As Assumption 1, let $d(Q_{31})+d(Q_{34})=0$ This assumes a constant total electrical energy input. Therefore:

$$w_g \times c \times d(T_{36}-T_{30})+d(w) \times c \times (T_{36}-T_{30})=-d(Q_{32}+Q_{35}) \qquad \text{Eq. (13)}$$

As Assumption 2, let $d(Q_{32}+Q_{35})=0$. This assumes a constant heat loss to the ambient environment. Therefore:

$$w_g \times d(T_{36}-T_{30})+d(w_g) \times (T_{36}-T_{30})=0 \qquad \text{Eq. (14)}$$

If both w and $(T_{36}-T_{30})$ are finite then if the process is controlled such that $(T_{36}-T_{30})$ is constant and therefore $d(T_{36}-T_{30})=0$:

$d(w_g)=0$ and the flow of glass is controlled such that the flow rate is constant.

If $d(T_{36}-T_{30})$ is not zero, then $d(w_g)$ is not zero, and an error in the glass flow is produced, which is corrected in an embodiment of the present invention.

The flow of glass is changed and the condition $d(T_{36}-T_{30})=0$ is maintained by changing the energy distribution. Referring to FIG. 3 the equation for the glass mass flow rate w is:

$$w_g=K_1 \times \eta \times \Delta p \qquad \text{Eq. (15)}$$

where:
$K_1$=flow coefficient of pipe
$\eta$=glass viscosity
$\Delta p$=pressure difference The glass viscosity is a function of temperature and is linearized for the temperature range considered by the present invention with the following equation:

$$w_g=K_0 \times T^k \times \Delta p + K_2 \qquad \text{Eq. (16)}$$

where:
$K_0$ and $K_2$=constants of proportionality
k=temperature exponent on the order of −10 to −20 for the glasses of interest Therefore the partial derivatives of the glass flow rate at the three measurement points (30), (33), and (36) in the downcomer pipe with respect to temperature are:

$$\partial w_g/\partial T_{30}=-k \times w_g/T_{30} \qquad \text{Eq. (17)}$$

$$\partial w_g/\partial T_{33}=-k \times w_g/T_{33} \qquad \text{Eq. (18)}$$

$$\partial w_g/\partial T_{36}=-k \times w_g/T_{36} \qquad \text{Eq. (19)}$$

The partial differential equation of the mass flow equation is:

$$\Delta w_g=\partial w_g/\partial T_{36} \times \Delta T_{36}+\partial w_g/\partial T_{33} \times \Delta T_{33}+\partial w_g/\partial T_{30} \times \Delta T_{30}+\partial w_g/\partial p_{36} \times \Delta p_{36}+\partial w_g/\partial p_{30} \times \Delta p_{30} \qquad \text{Eq. (20)}$$

As Assumption 3, let $\Delta p_{36}$ and $\Delta p_{30}$ equal 0, which makes each of the last two terms of Eq. (20) equal to zero:

$$\Delta w_g=\partial w_g/\partial T_{36} \times \Delta T_{36}+\partial w_g/\partial T_{33} \times \Delta T_{33}+\partial w_g/\partial T_{30} \times \Delta T_{30} \qquad \text{Eq. (21)}$$

As Assumption 4, for a stable process let $T_{36}$ and $T_{30}$ be constant, but allow $T_{33}$ to be variable. Therefore:

$$\Delta w_g=\partial w_g/\partial T_{33} \times \Delta T_{33} \qquad \text{Eq. (22)}$$

$$\Delta w_g=-k \times w_g/T_{33} \times \Delta T_{33} \qquad \text{Eq. (23)}$$

An apparatus of the present invention controls the mass flow rate ($w_g$) by changing the intermediate temperature $T_{33}$ while maintaining the total energy constant as constant, i.e. $d(Q_{31})+d(Q_{34})=0$. This change in flow rate caused by changing the intermediate temperature provides a correction to the flow rate error as indicated by $d(T_{36}-T_{30})$.

Figure 4:
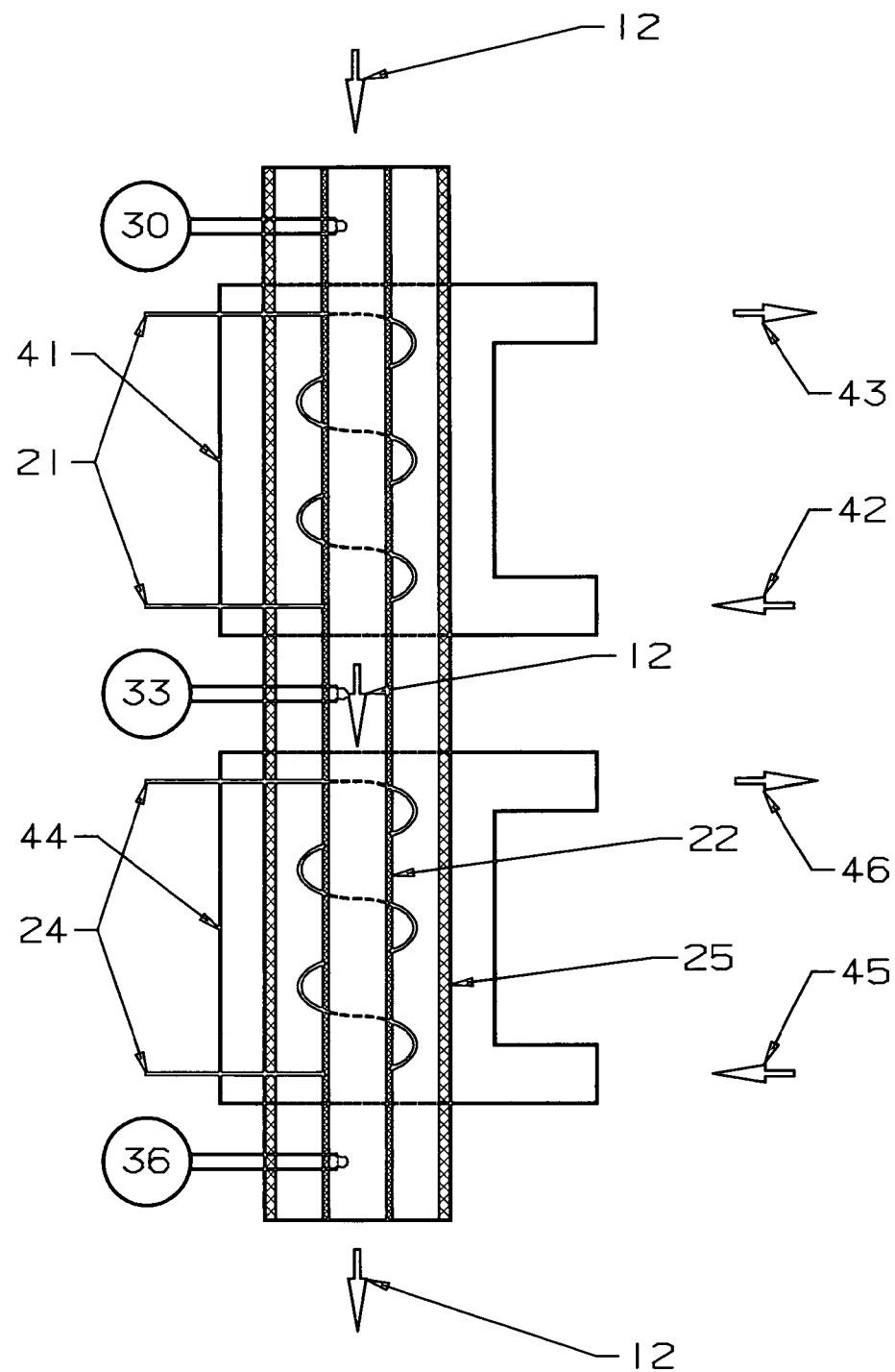
FIG. 4 shows a heated downcomer pipe with controlled heat loss to the environment in an embodiment of the present invention.

FIG. 4 shows another embodiment of the present invention, where additional heat control is provided by the incorporation of at least two cooling jackets (41) and (44) for controlled heat removal. In this embodiment, the heating elements (21) and (24) are used in combination with the cooling jackets (41) and

(44) to add heat to the system and remove heat from the system, respectively, in a controlled manner.

Referring to FIG. 4 the equations for the heat flow Q in the downcomer pipe (7) are:

$$Q_{30}=w_g \times c \times T_{30} \qquad \text{Eq. (24)}$$

$$Q_{21}=\text{Electric Power from (21)} \qquad \text{Eq. (25)}$$

$$Q_{43}=w_{a42} \times c_p \times (T_{43}-T_{42}) \qquad \text{Eq. (26)}$$

$$Q_{33}=w_g \times c \times T_{33} \qquad \text{Eq. (27)}$$

$$Q_{24}=\text{Electric Power from (24)} \qquad \text{Eq. (28)}$$

$$Q_{46}=w_{a45} \times c_p \times (T_{46}-T_{45}) \qquad \text{Eq. (29)}$$

$$Q_{36}=w_g \times c \times T_{36} \qquad \text{Eq. (30)}$$

where:
- $w_g$=glass (12) flow rate
- $w_a$=cooling air flow
- c=glass specific heat, assumed constant, therefore d(c)=0
- $c_p$=specific heat of air at constant pressure
- T=temperature
- h=convection heat transfer coefficient, assumed constant, therefore d(h)=0

Heat is added to the glass by the heating elements (21) and (24) and heat is lost to the ambient environment via the cooling jackets (41) and (44). The inlet air flow (42) and (45) to the cooling jackets has a lower temperature than the outlet air flow (43) and (46) leaving the cooling jackets.

Writing the energy balance equations:

$$Q_{33}=Q_{30}+Q_{21}-Q_{43} \qquad \text{Eq. (31)}$$

$$Q_{36}=Q_{33}+Q_{24}-Q_{46} \qquad \text{Eq. (32)}$$

Substituting Eq. (31) into Eq. (32) and transposing produces:

$$Q_{36}-Q_{30}=(Q_{21}+Q_{24})-(Q_{43}+Q_{46}) \qquad \text{Eq. (33)}$$

Substituting Eq. (24) and Eq. (30) into Eq. (33):

$$w_g \times c \times (T_{36}-T_{30})=Q_{21}+Q_{24}-(Q_{43}+Q_{46}) \qquad \text{Eq. (34)}$$

Taking the derivative of Eq. (34):

$$w_g \times c \times d(T_{36}-T_{30})+d(w_g) \times c \times (T_{36}-T_{30})=d(Q_{21})+d(Q_{24})-d(Q_{43}+Q_{46}) \qquad \text{Eq. (35)}$$

As Assumption 1, let $d(Q_{21})+d(Q_{24})=0$. This assumes a constant total electrical energy input. Therefore:

$$w_g \times c \times d(T_{36}-T_{30})+d(w) \times c \times (T_{36}-T_{30})=-d(Q_{43}+Q_{46}) \qquad \text{Eq. (36)}$$

As Assumption 2, let $d(Q_{43}+Q_{46})=0$. This assumes a constant heat loss to the ambient environment via the cooling jackets. Therefore:

$$w_g \times d(T_{36}-T_{30})+d(w_g) \times (T_{36}-T_{30})=0 \qquad \text{Eq. (37)}$$

Eq. (37) is identical to Eq. (14) and the rest of the derivation is the same as for the embodiment shown in FIG. 3. The embodiment of FIG. 4 allows heat to be added and heat to be removed in a controlled manner to insure constant heat loss to the ambient environment.

Figure 5:
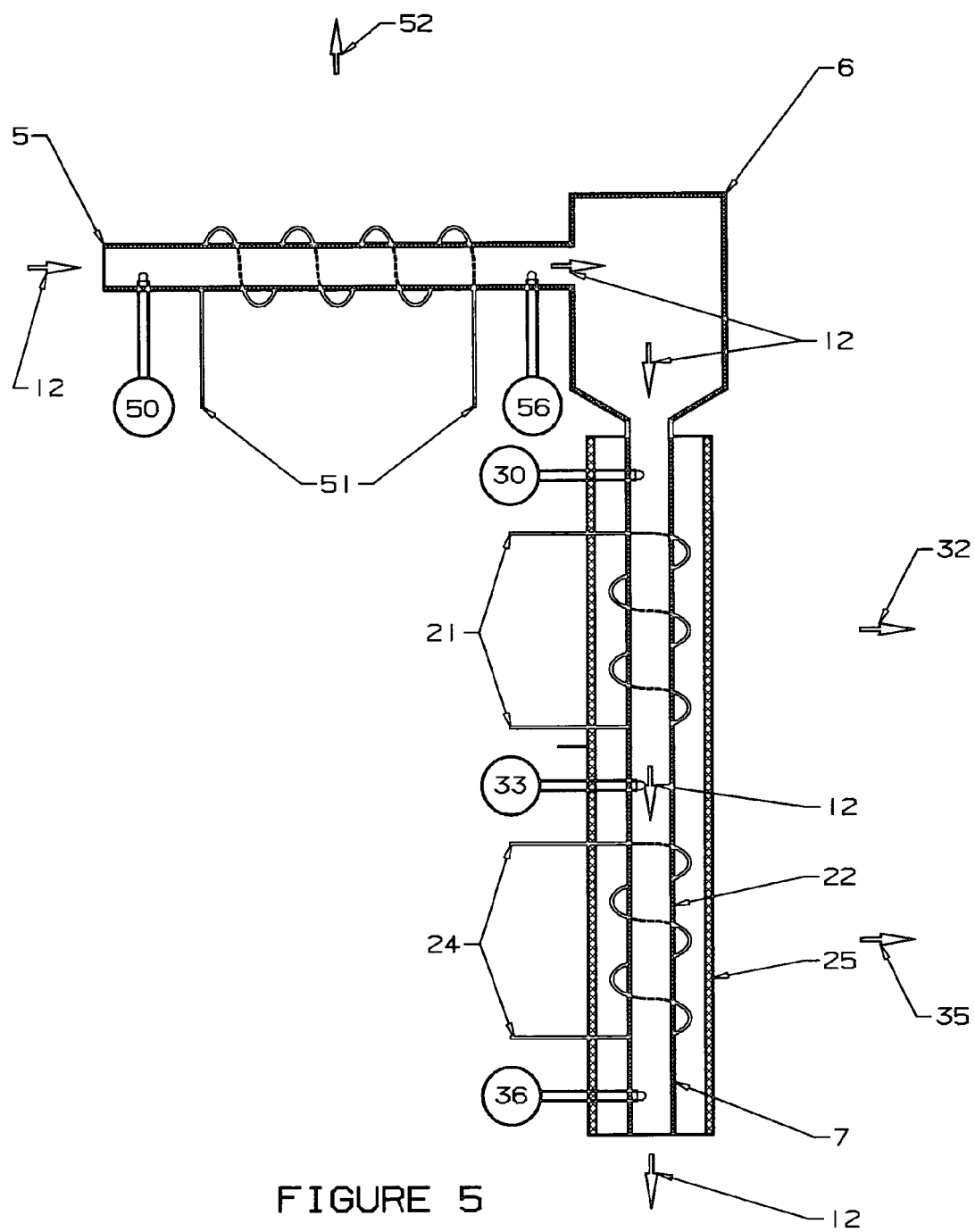
FIG. 5 shows a heated cooling pipe and a heated downcomer pipe with multiple zones of temperature control in an embodiment of the present invention.

FIG. 5 shows another embodiment of the present invention, which includes the downcomer pipe (7) of FIG. 3, a cooling pipe (5) and a bowl (6). In this embodiment, the glass flow rate is measured in the cooling pipe (5) and glass flow rate control is implemented in the downcomer pipe (7). The cooling pipe (5) is designed with at least two thermocouples (50) and (56) and at least one heating element (51). The downcomer pipe (7) is designed with at least two thermocouples (30) and (36) and optionally a third thermocouple (33), preferably at least two heating elements (21) and (24), and an insulation jacket (25). Following is the derivation for implementing glass flow rate measurement in the cooling pipe (5).

Referring to FIG. 5 the equations for the heat flow Q in the cooling pipe (5) are:

$$Q_{50}=w_g \times c \times T_{50} \qquad \text{Eq. (38)}$$

$$Q_{51}=\text{Electric Power at (51)} \qquad \text{Eq. (39)}$$

$$Q_{52}=h_{52} \times A \times (T_{52}-T_{amb})+\epsilon_{52} \times \sigma \times A \times (T_{52}^4-T_{amb}^4) \qquad \text{Eq. (40)}$$

$$Q_{56}=w_g \times c \times T_{56} \qquad \text{Eq. (41)}$$

Heat is added to the glass by a heating element (51) and heat (52) is lost to the ambient (amb) environment along the cooling pipe (5).

Writing the energy balance equation:

$$Q_{56}=Q_{50}+Q_{51}-Q_{52} \qquad \text{Eq. (42)}$$

Transposing:

$$Q_{56}-Q_{50}=Q_{51}-Q_{52} \qquad \text{Eq. (43)}$$

Substituting Eq. (38) and Eq. (41) into Eq. (43)

$$w_g \times c \times (T_{56}-T_{50})=Q_{51}-Q_{52} \qquad \text{Eq. (44)}$$

Taking the derivative of Eq. (44):

$$w_g \times c \times d(T_{56}-T_{50})+d(Q_{51})-d(Q_{52}) \qquad \text{Eq. (45)}$$

As Assumption 1, let $d(Q_{51})=0$ This assumes a constant total electrical energy input. Therefore:

$$w_g \times c \times d(T_{56}-T_{50})+d(w_g) \times c \times (T_{56}-T_{50})=-d(Q_{52}) \qquad \text{Eq. (46)}$$

As Assumption 2, let $d(Q_{52})=0$. This assumes a constant heat loss to the ambient environment. Therefore:

$$w_g \times c \times d(T_{56}-T_{50})+d(w_g) \times c \times (T_{56}-T_{50})=0 \qquad \text{Eq. (47)}$$

Dividing by c:

$$w_g \times d(T_{56}-T_{50})+d(w_g) \times (T_{56}-T_{50})=0 \qquad \text{Eq. (48)}$$

If both $w_g$ and $(T_{56}-T_{50})$ are finite and if the process is controlled such that $(T_{56}-T_{50})$ is constant $(d(T_{56}-T_{50})=0)$: $d(w_g)=0$ and the flow of glass is controlled such that the flow rate is constant.

If $d(T_{56}-T_{50})$ is not zero, then $d(w_g)$ is not zero, and an error in the glass flow is produced, which is corrected in an embodiment of the present invention.

In this embodiment of the invention the cooling pipe (5) is used as the measure of glass flow rate. The energy input from the heating element (51) and the energy lost to the ambient environment are constant. Therefore any change in the temperature difference between the glass entering (50) and the glass exiting (56) is indicative of a change in glass flow (12).

Equations 15 through 23 are applied in the same manner as the previous embodiments to change the impedance of the downcomer and control the glass (12) flow rate to the sheet glass forming apparatus (11).

Figure 6:
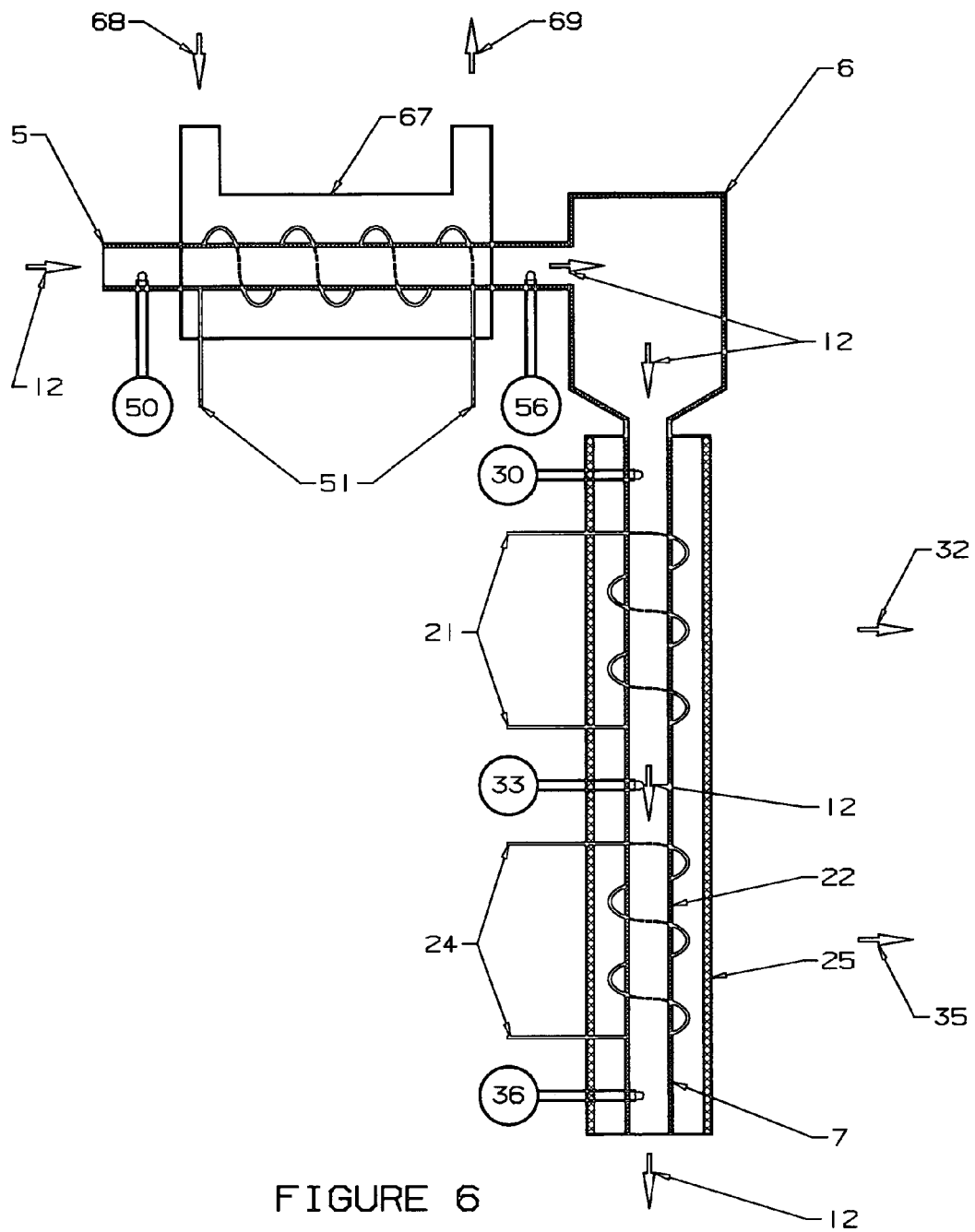
FIG. 6 shows a heated cooling pipe with controlled heat loss to the environment and a heated downcomer pipe with multiple zones of temperature control in an embodiment of the present invention.

FIG. 6 shows another embodiment of the present invention, where additional heat control is provided by the addition of a cooling jacket (67) to the cooling pipe (5) for controlled heat removal. In this embodiment the heating element (51) is used in combination with the cooling jacket (67) to add heat to the system and remove heat from the system, respectively, in a controlled manner. This substantially improves the accuracy of the measurement of the glass (12) flow rate.

Referring to FIG. 6 the equations for the heat flow Q in the cooling pipe (5) are:

$$Q_{50}=w_g \times c \times T_{50} \qquad \text{Eq. (49)}$$

$$Q_{51}=\text{Electric Power at (51)} \qquad \text{Eq. (50)}$$

$$Q_{69}=w_{a68} \times c_p \times (T_{69}-T_{68}) \quad \text{Eq. (51)}$$

$$Q_{56}=w_g \times c \times T_{56} \quad \text{Eq. (52)}$$

Heat is added to the glass by a heating element (51), and heat (69) is lost to the ambient (amb) environment via the cooling jacket (67). The inlet air flow (68) to the cooling jacket has a lower temperature than the outlet air flow (69) leaving the cooling jacket.

Writing the energy balance equation:

$$Q_{56}=Q_{50}+Q_{51}-Q_{69} \quad \text{Eq. (53)}$$

Transposing:

$$Q_{56}-Q_{50}=Q_{51}-Q_{69} \quad \text{Eq. (54)}$$

Substituting Eq. (49) and Eq. (52) into Eq. (54)

$$w_g \times c \times (T_{56}-T_{50})=Q_{51}-Q_{69} \quad \text{Eq. (55)}$$

Taking the derivative of Eq. (55):

$$w_g \times c \times d(T_{36}-T_{30})+d(w_g) \times c \times (T_{36}-T_{30})=d(Q_{51})=-d(Q_{69}) \quad \text{Eq. (56)}$$

As Assumption 1, let $d(Q_{51})=0$ This assumes a constant total electrical energy input. Therefore:

$$w_g \times c \times d(T_{36}-T_{30})+d(w_g) \times c \times (T_{36}-T_{30})=-d(Q_{69}) \quad \text{Eq. (57)}$$

As Assumption 2, let $d(Q_{69})=0$. This assumes a constant heat loss to the ambient environment via the cooling jacket. Therefore:

$$w_g \times c \times d(T_{56}-T_{50})+d(w_g) \times c \times (T_{56}-T_{50})=0 \quad \text{Eq. (58)}$$

Dividing by c:

$$w_g \times d(T_{56}-T_{50})+d(w_g) \times (T_{56}-T_{50})=0 \quad \text{Eq. (59)}$$

If both $w_g$ and $(T_{56}-T_{50})$ are finite and if the process is controlled such that $(T_{56}-T_{50})$ is constant $(d(T_{56}-T_{50})=0)$:

$d(w_g)=0$ and the flow of glass is controlled such that the flow rate is constant.

If $d(T_{56}-T_{50})$ is not zero, then $d(w_g)$ is not zero, and an error in the glass flow is produced, which is corrected in an embodiment of the present invention.

In this embodiment of the invention the cooling pipe (5) is used as the measure of glass flow rate. The energy input from the heating element (51) and the energy removed by the cooling jacket (67) are each maintained constant. Therefore any change in the temperature difference between the glass entering (50) and the glass exiting (56) is indicative of a change in glass flow (12).

Equations 15 through 23 are applied in the same manner as the previous embodiments to change the impedance of the downcomer pipe and control the glass (12) flow rate to the sheet glass forming apparatus (11).

Figure 7:
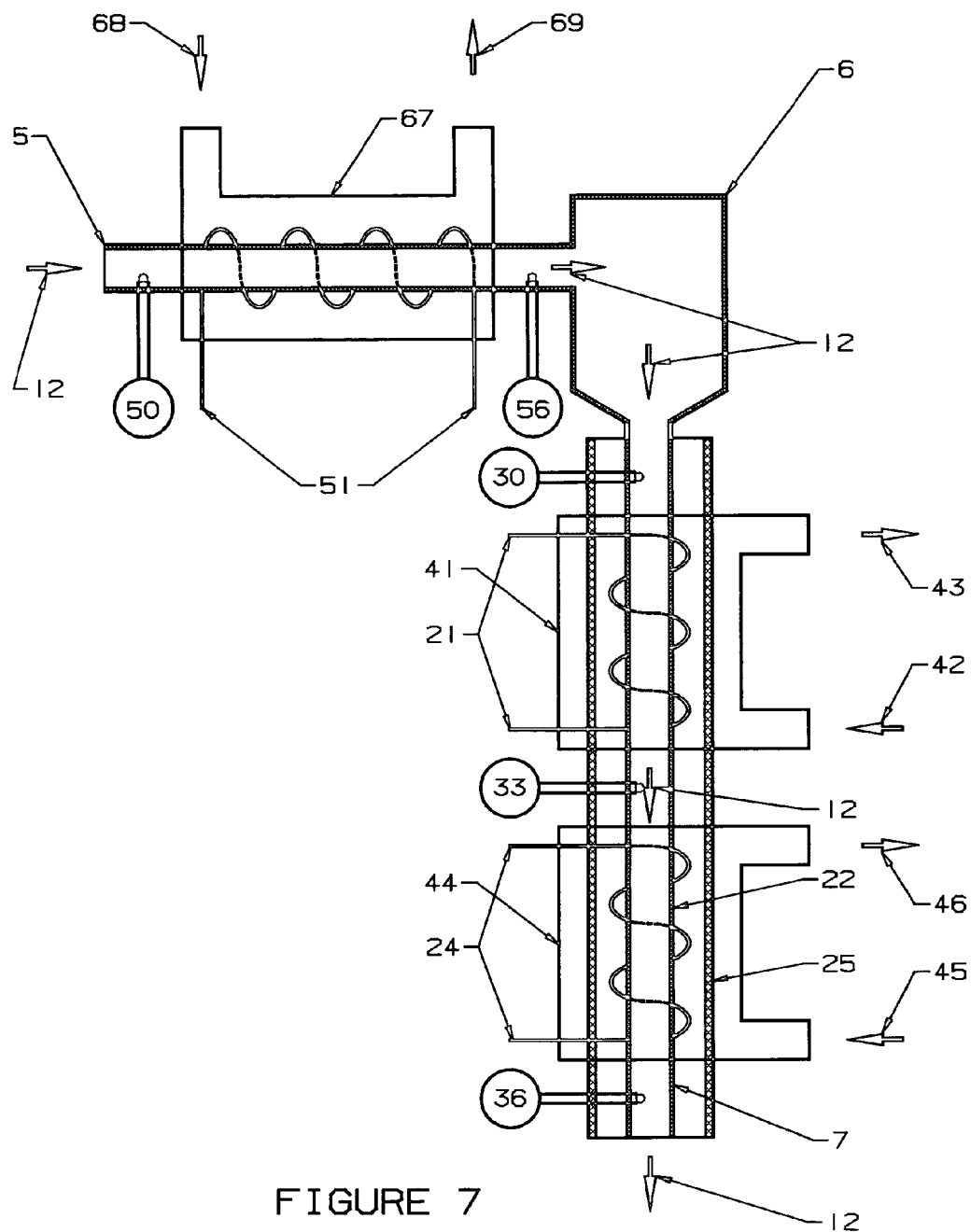
FIG. 7 shows a heated cooling pipe with controlled heat loss to the environment and a heated downcomer pipe with multiple zones of temperature control and controlled heat loss to the environment in an embodiment of the present invention.
Figure 8:
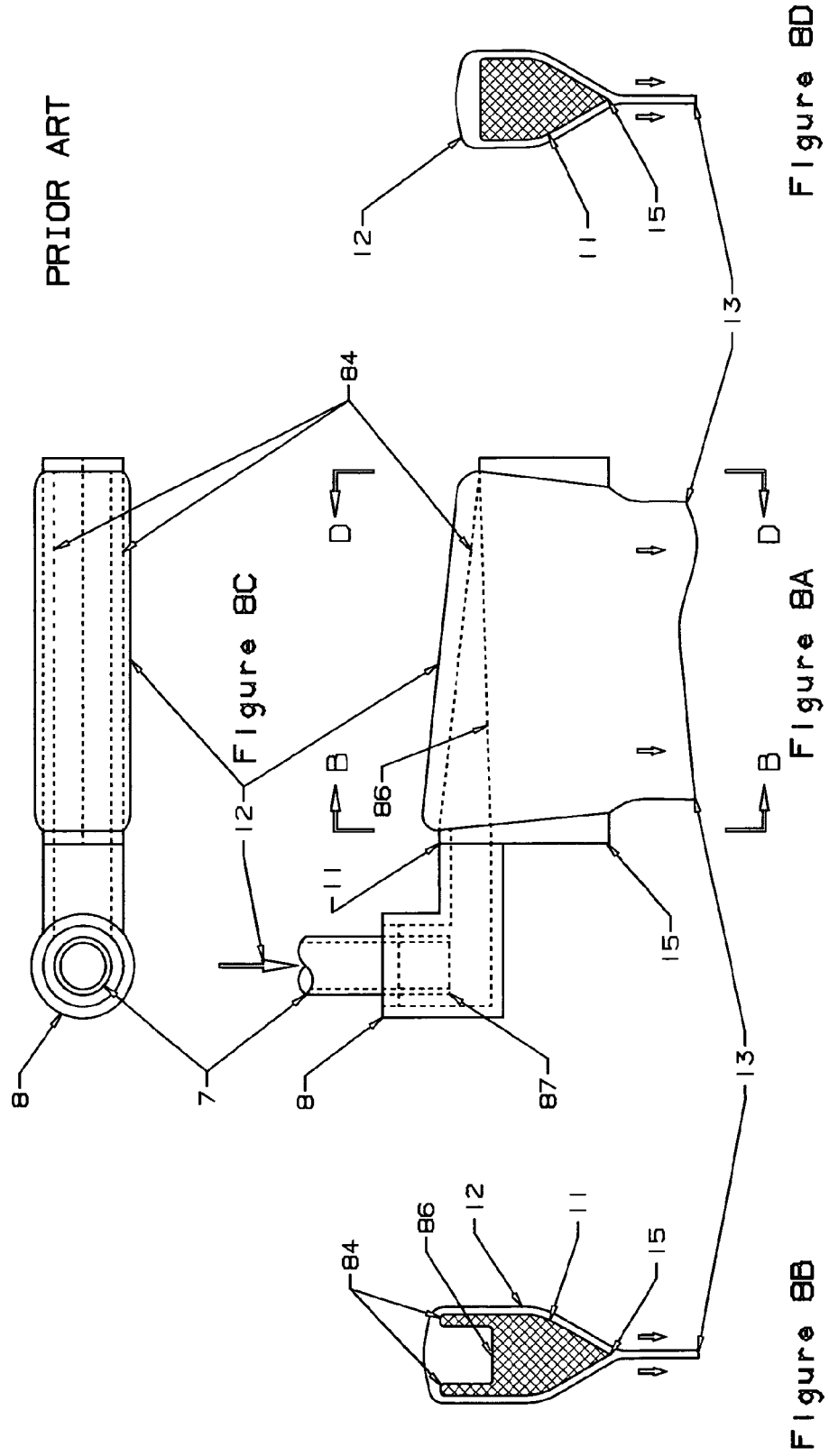
FIG. 8A is a side view of the prior art overflow downdraw sheet glass forming apparatus.
FIG. 8B is a cross-section of the forming block shown in FIG. 8A across lines B-B.
FIG. 8C is a top view of the prior art overflow downdraw sheet glass forming apparatus.
FIG. 8D is a cross-section of the forming block shown in FIG. 8A across lines D-D.

FIG. 7 shows another embodiment of the present invention, where a further addition of heat control is provided by the addition of cooling jackets (41) and (44) to the downcomer pipe (7) for controlled heat removal. The cooling jacket (67) on the cooling pipe (5) is the most important as it improves the accuracy of the glass (12) flow rate measurement. Although not as important, the cooling jackets (41) and (44) added to the downcomer pipe (7) provide additional stability to the control of glass (12) flow by the downcomer pipe (7).

Discussion of the Assumptions

Four assumptions were made as part of this derivation. Justification and action to implement are discussed below:

Assumption 1—Constant Total Electrical Energy Input

This assumption is easily implemented, as there is complete control over the electric power equipment.

Assumption 2—Constant Heat Loss to the Ambient

For short term operation on many systems, constant convection and radiant heat loss is a valid assumption. If long term stability of the heat loss to the ambient is required, a controlled cooling jacket may be included in the design. FIG. 4 shows two such cooling jackets (41) and (44) for the downcomer pipe (7), each for individual control zones (21) and (24). The air flow (42) and (45) into each cooling jacket (41) and (44) is controlled to a value such that the heat extracted is constant. The air flow (43) and (46) out of the cooling jackets has a higher temperature than the air flow in (42) and (45). FIG. 6 shows a cooling jacket (67) for the cooling pipe (5). The inlet air flow (68) to the cooling jacket (67) is controlled such that the heat extracted is constant. The outlet air flow (69) has a higher temperature than the inlet air flow (68).

The energy equations for air are the same as for glass but with different values for the coefficients:

$$Q_{43}=w_{a42} \times c_p \times (T_{43}-T_{42}) \quad \text{Eq. (60)}$$

$$Q_{46}=w_{a45} \times c_p \times (T_{46}-T_{45}) \quad \text{Eq. (61)}$$

$$Q_{69}=w_{a68} \times c_p \times (T_{69}-T_{68}) \quad \text{Eq. (62)}$$

The general form of the above equations is:

$$Q_x=w_{a,y} \times c_p \times (T_x-T_y) \quad \text{Eq. (63)}$$

Taking the derivative:

$$d(Q_x)=w_{a,y} \times c_p \times d(T_x-T_y)+d(w_{a,y}) \times c_p \times (T_x-T_y) \quad \text{Eq. (64)}$$

let $d(Q_x)=0$ (Constant heat loss) therefore:

$$d(w_{a,y})=-w_{a,y}/(T_x-T_y) \times d(T_x-T_y) \quad \text{Eq. (65)}$$

The value of $Q_x$ in each case is maintained constant by varying the air flow $d(w_{a,y})$ thus maintaining the value of $w_{a,y} \times c_p \times (T_x-T_y)$ constant for each cooling jacket using Eq. (65).

Assumption 3—Constant Pressure

The downcomer pipe (7) exit pressure $p_{36}$ is substantially constant, as it is a function of the free surface in the forming apparatus inflow pipe (8). There is a low impedance to flow in the inflow pipe (8) such that the level of the glass free surface in the inflow pipe (8) is close to the same level of the glass overflowing the weirs at the inflow end of the forming block (11). Therefore $(\Delta p_{36}=0)$ is a valid assumption. The downcomer pipe (7) inlet pressure is dependent on the upstream process and therefore $\Delta p_{30}=0$ is not a good assumption for normal operation. If the bowl (6) has a free surface, then $p_{30}$ is a function of the glass level in the bowl (6). If the bowl top is sealed, $p_{30}$ is a function of the glass level in the stirrer chamber (4) and the flow parameters of the stirrer chamber (4), the flow parameters of the cooling pipe (5), and the flow parameters of the bowl (6). If $p_{30}$ is not at the normal operating condition then Eq. (66) is used to compensate for changes in $p_{30}$:

$$\partial w_g/\partial T_{33} \times \Delta T_{33}+\partial w_g/\partial p_{30} \times \Delta p_{30}=0 \quad \text{Eq. (66)}$$

Assumption 4—Constant Temperature

A process objective is to maintain the downcomer pipe exit temperature $T_{36}$ constant, as this is the inlet temperature to the forming apparatus inflow pipe. The downcomer pipe inlet temperature $T_{30}$ is dependent on the upstream process and therefore $\Delta T_{30}=0$ is not a good assumption for normal operation. The stated objective of this flow control method is to control the glass flow constant by maintaining $(T_{36}-T_{30})$ at a fixed value. This cannot be done if $T_{30}$ varies and $T_{36}$ must be maintained at a fixed value. The error in $T_{30}$ is compensated by applying Eq. (67):

$$\Delta(Q_{31}+Q_{34})=w_g \times c \times \Delta(T_{30}) \quad \text{Eq. (67)}$$

where:

$\Delta(T_{30})$=difference between the desired and actual $T_{30}$

Application of this Invention to the General Class of Platinum Delivery Systems

The method and apparatus of the present invention can also be used to measure and regulate glass flow in platinum delivery systems for other manufacturing processes, which require optical quality glass including, but not limited to lenses for eyeglasses, telescopes, microscopes, LCD glass, and projection televisions. A platinum delivery system for a process other than the overflow process normally includes a finer (3), a stirrer (4), and a cooling pipe (5), similar to those of the overflow process; however, the bowl (6) and the downcomer pipe (7) of the overflow process are replaced by a device that fulfills the requirements of the specific manufacturing process, to which the glass is being supplied. If this device is not adaptable to the invention herein, either the finer (3) or the cooling pipe (5), or both in combination are used as described below in the application of the present invention.

Application of this Invention to the Finer

The method and apparatus of the present invention is also used in the finer (3) as a measure of glass flow rate and to implement glass flow rate control. The finer (3) is designed with thermocouples, heating elements, insulation jackets, and cooling jackets in the same manner as the downcomer pipe and the same strategy for the measurement and control of glass flow rate is used. Placement of the thermocouples in the glass stream of the finer (3) is normally not detrimental to glass quality as the glass is mixed in the stirrer (4), if a stirrer (4) is installed, after passing through the finer (3). The finer vents (17) are locations where thermocouples are preferably inserted for glass temperature measurement.

Application of this Invention to the Cooling Pipe

The method and apparatus of the present invention is also used in the cooling pipe (5) as a measure of glass flow rate and to implement glass flow rate control. The cooling pipe (5) is preferably designed with thermocouples, heating elements, insulation jackets, and cooling jackets in the same manner as the downcomer pipe, and the same strategy for the measurement and control of glass flow rate is used. The temperature difference between the glass entering the cooling pipe (5) and the glass exiting the cooling pipe (5) is normally quite large, i.e. 200° C. A large temperature difference increases the accuracy of the glass flow rate measurement.

Application of this Invention to the Combination of a Finer and a Cooling Pipe

The method and apparatus of the present invention is also used in the combination of the finer (3) and the cooling pipe (5) as a measure of glass flow rate and to implement glass flow rate control. The finer (3) and cooling pipe (5) is preferably designed with thermocouples, heating elements, insulation jackets, and cooling jackets in the same manner as the downcomer pipe, and the same strategy for the measurement and control of glass flow rate is used. In a preferred embodiment the combination of the finer (3) and cooling pipe (5) can be treated the same as the two heating elements in FIG. 3 and equations 1 through 23 applied. Heating element (21) represents the finer (3) and heating element (24) represents the cooling pipe (5). In the same manner, another preferred embodiment is represented by the equations associated with FIG. 4. In other preferred embodiments, the equations associated with FIGS. 5, 6, and 7 are alternatively applied to different heating and cooling configurations of the combination of the finer (3) and the cooling pipe (5).

Placement of Thermocouples in the Glass Stream

Referring to FIGS. 3, 4, 5, 6, and 7, a preferred embodiment of the present invention includes immersing the thermocouples (30), (33), (36), (50), and (56) directly in the process stream to measure accurately the temperature of the flowing glass at the important locations in the cooling pipe (5) and the downcomer pipe (7). These thermocouples are placed such that they will not have an adverse effect on the sheet glass quality. The thermocouples are preferably immersed in locations directly in the path of molten glass flow where defects caused by the flow of glass in proximity of the thermocouples end up in the unusable beads at either end of the formed glass sheet. The placement of these thermocouples is discussed further in U.S. Pat. No. 6,895,782, and patent application Ser. No. 11/011,657.

Prevention and Correction of Forming Block Deformation

The refractory materials from which the forming block and its support structure are made have high strength in compression and low strength in tension. Like most structural materials they also change shape when stressed at high temperature by a process termed "Thermal Creep". These material characteristics and how these characteristics effect the manufacturing process provided motivation for the present invention.

FIGS. 8A-8D illustrate the principle parts of a typical "Overflow Process" forming apparatus in more detail than shown in FIG. 1. The molten glass (12) from the melting furnace and forehearth, which must be of substantially uniform temperature and chemical composition, enters the forming apparatus through the downcomer pipe (7) and flows into the sheet forming block (11) trough. The glass sheet forming apparatus, which is described in detail in both U.S. Pat. Nos. 3,338,696, 6,889,526, and 6,895,782, and patent application Ser. No. 11/011,657, is a wedge shaped forming block (11). Straight sloped weirs (84) substantially parallel with the pointed edge of the wedge, herein termed the root (15), form each side of the forming block trough. The forming block trough bottom (86) and the sides of the trough are contoured in a manner to provide even distribution of glass to the top of each side weir (84). The molten glass (12) then flows through the forming block (11) trough, over the top of each side weir (84), down each side of the wedge shaped forming block (11), and joins at the root (15) to form a sheet of molten glass. The molten glass is then cooled as it is pulled off the root (15) to form a solid glass sheet (13) of substantially uniform thickness.

Figure 9:
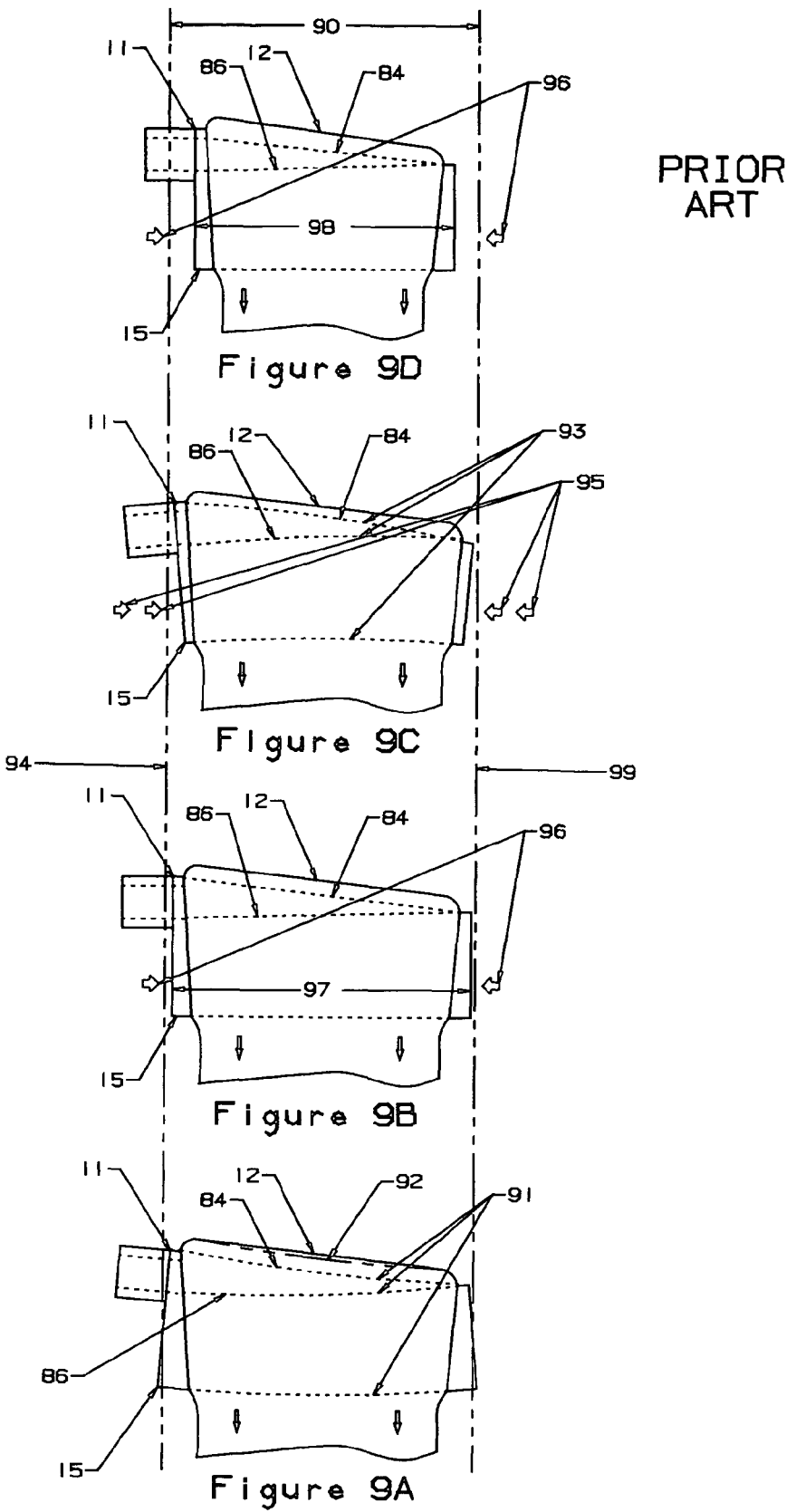
FIG. 9A is an illustration of the thermal creep deformation of the glass forming block under the load of its own weight.
FIG. 9B is an illustration of the thermal creep deformation of the glass forming block under an applied load that minimizes vertical deformation.
FIG. 9C is an illustration of the thermal creep deformation of the glass forming block under excessive applied load.
FIG. 9D is an illustration of the thermal creep deformation of the glass forming block under an applied load that minimizes vertical deformation over the extended period of a production campaign.

FIGS. 9A-9D illustrate the typical effects of thermal creep on the shape of the forming block (11) when the forming block end support blocks impart different compression stress in the bottom of the forming block (11) near the root (15). FIG. 9A shows that with no compression loading the forming block (11) sags in the middle such that the top of the weirs (84) and the root (15) are now curved (91) and the trough bottom (86) has a change in curvature (91). This curvature (91) causes the molten glass (12) to no longer flow with constant thickness (92) over the weirs (84). This curvature (91) allows more glass to flow over the middle of the weirs resulting in an uneven sheet thickness distribution. The forming block (11) has an initial length (90) as defined by the phantom lines (94) and (99). With no external loading the weirs (84) get shorter and the root (15) gets longer. FIG. 9B shows that sagging of the forming block is minimized under the optimum compression loading (96) of the lower section of the forming block (11) near the root (15). With optimal loading both the weirs (84) and the root (15) shorten equally to length (97). FIG. 9C shows that if too much load (95) is applied to the lower section of the forming block (11) near the root (15), the root (15) is compressed excessively, thus producing a convex shape (93) to the forming block weirs (84), the forming block trough bottom (86), and the root (15). The root (15) shortens considerably more than the weirs (84) as can be seen by the movement relative to the phantom lines (94) and (99). FIGS. 9A through 9C represent the effect of thermal creep over the same time period. FIG. 9D shows a forming block (11), which has shortened a greater amount to length (98), since imparting the correct load allows a substantially longer production campaign. This increased shortening now has an adverse effect on the width of the sheet manufactured.

Figure 10:
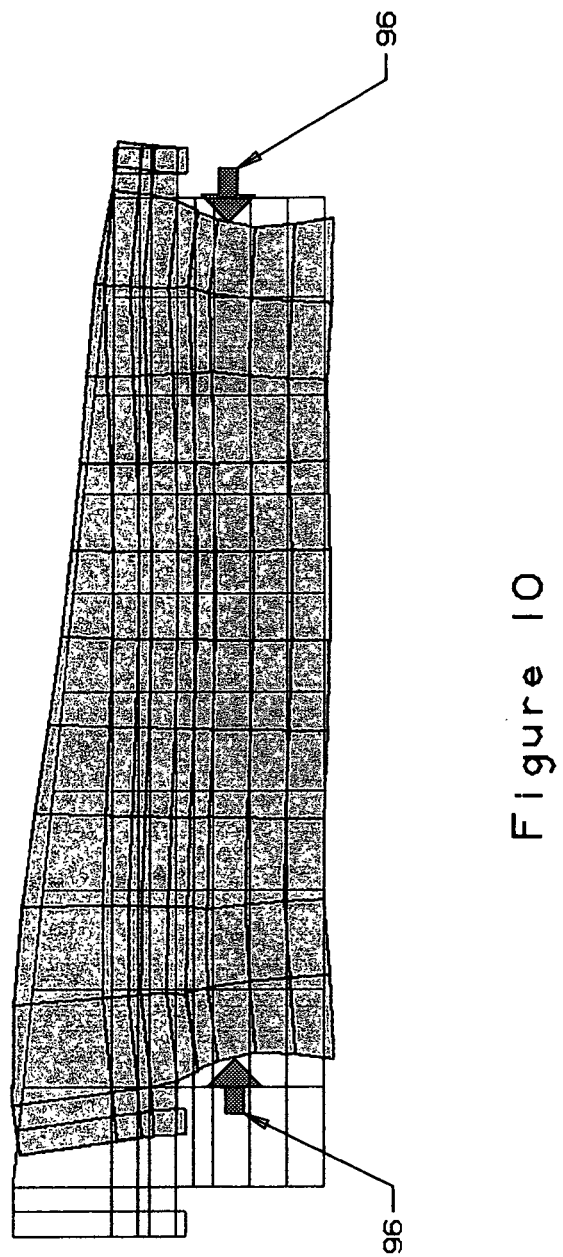
FIG. 10 shows the magnified shape of the forming block with the sag correction by prior art applied force as determined by a finite element analysis (FEA).

FIG. 10 shows the magnified shape of a typical prior art forming block as corrected for sagging due to thermal creep. This was a result of a finite element analysis (FEA) to determine the optimal sag correcting force (96) for a typical forming block. The forming block size chosen for this example has a weir (84) overflow length of 2 meters, a height of approximately 0.6 meters and a width of 0.2 meters.

Improved Loading of the Forming Block to Minimize Thermal Creep

FIGS. 11A through 11E show a preferred embodiment of this invention whereby inserts (113) and (117) are used to distribute the loading forces (122) and (128) to both the ends and to the interior of the forming block (111), with weirs (114) and trough bottom (116). This invention is similar to the multi-stage loading device which is an invention applied for by the inventor of the present application in patent application Ser. No. 11/060,139; however, in this invention only one compression loading device is required at each end of the forming block. In the present invention, the compression loading of the bottom of the forming block (111) is applied at each end and is distributed into the interior of the forming block by using inserts (113) and (117) which have greater thermal creep resistance than the parent material of the forming block (111). At the inflow end the bottom of the forming block (111) insert (113) is loaded by the support and compression block (112) with a force (122). The insert (113) is inserted into a cavity of depth (115) and applies force (125) at the bottom of this cavity and force (123) at the bottom of the inflow end of the forming block (111). At the far end the bottom of the forming block (111) insert (117) is loaded by the support and compression block (118) with a force (128). The insert (117) is inserted into a cavity of depth (119) and applies force (129) at the bottom of this cavity and force (127) at the bottom of the far end of the forming block (111). In one embodiment, the depth of cavity (115) and the depth of cavity (119) are independent and range from 0 to 40 percent of a length of the root. More preferably, the depth of cavity (115) ranges from 20 to 35 percent, while the depth of cavity (119) ranges from 10 to 25 percent of a length of the root. The force balances at each end are:

$$F_{122}=F_{123}+F_{125} \qquad \text{Eq. (68)}$$

$$F_{128}=F_{127}+F_{129} \qquad \text{Eq. (69)}$$

FIGS. 11A and 11E show the weight of the forming block (111) supported by the support and compression blocks (112) and (118). Normally the force at the inflow end (122) would be equal to the force at the far end (128); however, in some embodiments of this invention it is necessary to have a small force (110) to seal the inflow pipe to the forming block. In this instance, the force at the far end (128) is larger by force (110) than the force at the inflow end (122) such that:

$$F_{128}=F_{122}+F_{110} \qquad \text{Eq. (70)}$$

Alternately force (120) at the top of the far end may be used to provide the sealing force (120). Including force (120), the equation to balance the forces is:

$$F_{128}+F_{120}=F_{122}+F_{110} \qquad \text{Eq. (71)}$$

Figure 12:
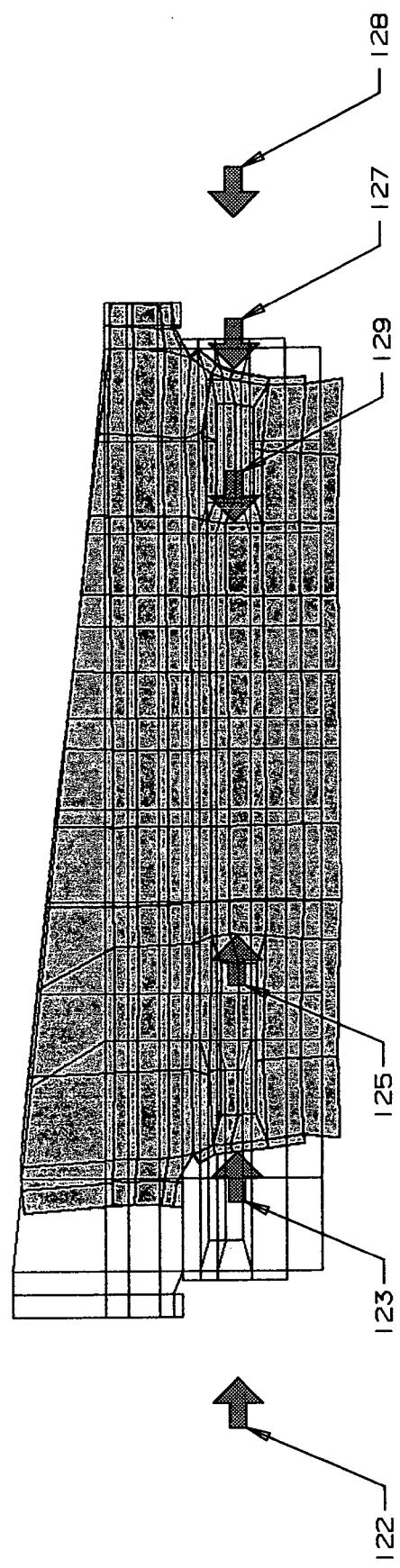
FIG. 12 shows the magnified shape of the embodiment of this invention shown in FIGS. 11A through 11E with the sag corrected as determined by FEA.

FIG. 12 shows the magnified shape of an FEA of the application of a preferred embodiment of this invention to the same size forming block as shown in FIG. 10. Comparison of the resultant shape of the two apparatuses as shown in FIGS. 10 and 12 show substantially improved shape control using the present invention.

Figure 19:
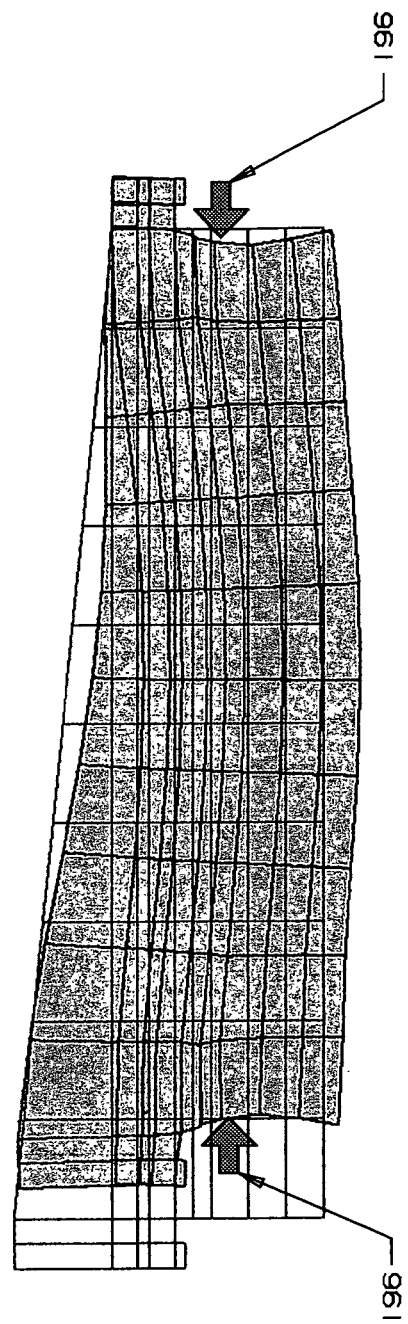
FIG. 19 shows the magnified shape of the prior art forming block with the sag resultant from a 20 percent lower prior art applied force as determined by FEA.

FIG. 19 shows the magnified shape of the forming block from the application of a force (196), which is 80 percent of the optimum force (96). It can be seen from comparison of the forming block shape in FIGS. 10, 12, and 19, that a lesser application of force has a substantial influence on the corrected shape of the forming block.

FIG. 13A through 13E shows forming block (131) in another embodiment of the present invention. The inflow end insert (132) has a stepped shape such that it can apply interior forces (133) and (134) at depths (135) and (136), respectively. In this instance the force balance at the inflow end is:

$$F_{122}=F_{132}+F_{133}+F_{134} \qquad \text{Eq. (72)}$$

FIG. 13A through 13E also show an embodiment of the present invention whereby the far end insert has a necked shape (139) in the center. The purpose of the shaping (139) of the insert (137) is to control the relative magnitudes of the applied surface force (127) and interior force (129) as described in the following section. In this instance the force balance at the far end is:

$$F_{128}=F_{127}+F_{129} \qquad \text{Eq. (73)}$$

Controlling the Ratio of Surface to Interior Forces

In a preferred embodiment, molybdenum is the material used for the insert. Platinum cladding of the insert is preferable but not always necessary to protect the molybdenum from oxidation. Molybdenum has a thermal creep resistance on the order of 4 times that of high quality Zircon, which is the material normally used for the forming blocks (111) and (113).

As the forming block in the region of an insert deforms due to thermal creep the insert is more resistant to the effects of thermal creep and deforms less, thus increasing the force at the bottom of the cavity. This increased force at the bottom of the cavity in turn increases the deformation of the insert, until eventually a balance in deformation of the forming block and the insert produces a balance in forces.

The design of the cavities and the inserts as they effect the shape of an individual forming block are determined using FEA. The forces are of a distributed nature, however, a very rough rule of thumb would be applied as:

Insert Thermal Creep Constant times Insert Area
Equals Forming Block Thermal Creep Constant
times Forming Block Compression Area Correction for the Effects of Thermal Creep During the Production Campaign If the shape of the forming block in the production environment exactly followed the results of the physics of the FEA, the manufacture sheet thickness would remain within product specification for the duration of an extended production campaign. The realities of the manufacturing world such as material homogeneity, temperature distribution, friction forces, measurement errors, and human intervention, etc., cause deviation from the theoretical physics. It is important to note that these realities do not violate the physics, but cause deviations from the assumed physics. This means that the cause and effect of mathematical and physical analysis as determined by FEA and computational fluid dynamics (CFD) still apply.

Single Force Embodiment

The present invention teaches a procedure for maintaining the sheet thickness profile within specification for an extended production campaign in spite of the influence of the manufacturing world realities noted above. As an example, if the friction opposing the applied force (96) reduced its effect to the level of force (196) the forming block would sag in the middle after a given period of time in the production campaign. Intuitively this would produce a sheet which is thicker in the middle than at each end. The teaching of Dockerty in U.S. Pat. No. 3,338,696 and CFD both substantially verify that the sheet would be thicker in the middle. In an embodiment of the present invention the force (96) is increased to both overcome this friction effect and produce a reversal of the sagging such that the sheet is now of a more uniform thickness. This embodiment of the present invention is the most simplistic and the correction of the sagged shape is limited. The details of the strategy for correcting the sheet thickness are discussed in the following multi-stage embodiment, but also apply directly to this simpler single force embodiment.

Multi-Stage Force Embodiment

FIGS. 14A through 14E show a multi-stage loading device which is an invention applied for by this inventor in patent application Ser. No. 11/060,139. Compression loading of the bottom of the forming block (141), which has weirs (144) and trough bottom (146), is applied at each end by a multi-stage loading device. At the inflow end the bottom of the forming block (141) is loaded by the support and compression block (143) with a force (156) and the compression block (142) with a force (157). The compression block (142) is inserted into a cavity of a depth (145) at the inflow end and applies force (157) at the bottom of the cavity. At the far end the bottom of the forming block (141) is loaded by the support and compression block (147) with a force (159) and the compression block (148) with a force (158). The compression block (148) is inserted into a cavity of depth (149) at the far end and applies force (158) at the bottom of this cavity. FIGS. 14A and 14E show the weight of the forming block (141) being supported by the support and compression blocks (143) and (147). Normally the sum of the forces at the inflow end "(156) plus (157)" is equal to the sum of the forces at the far end "(158) plus (159)"; however, in some embodiments of this invention it may be necessary to have a small force (140) to seal the inflow pipe to the forming block. In this instance, the sum of the forces at the far end "(158) plus (159)" would be larger by force (140) than the sum of the forces at the inflow end "(156) plus (157)" such that:

$$F_{158}+F_{159}=F_{156}+F_{157}+F_{140} \quad \text{Eq. (74)}$$

Alternately force (150) at the top of the far end may be used to provide the sealing force (150). Forces (140) and (150) are not included in the calculations in the embodiments described below; however, they may be used as part of other embodiments to add additional options for the reshaping of the forming block (141). Forces (140) and (150) need not be equal in these embodiments. Including force (150) the equation to balance the forces is:

$$F_{158}+F_{159}+F_{150}=F_{156}+F_{157}+F_{140} \quad \text{Eq. (75)}$$

Figure 15:
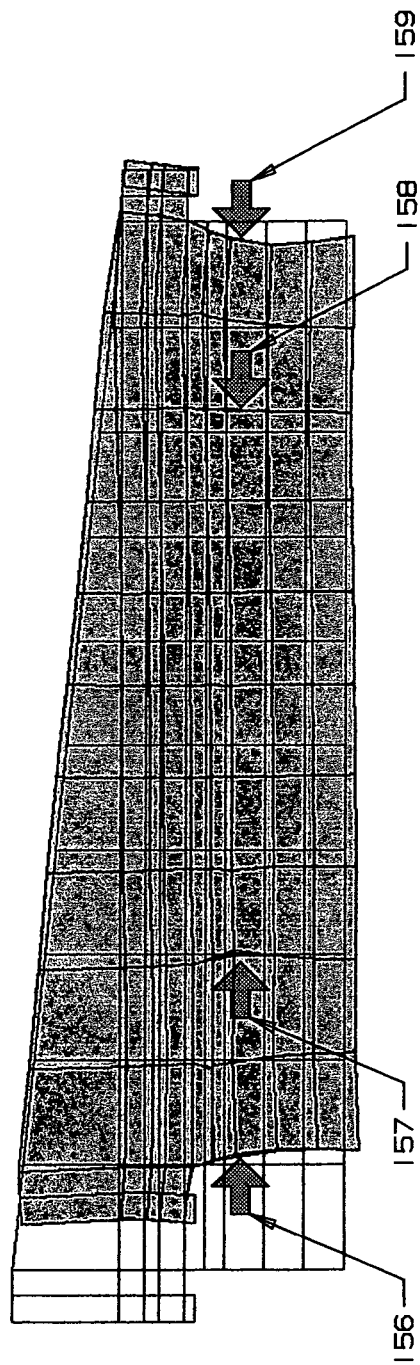
FIG. 15 shows the magnified shape of the forming block with the sag correction by a multi-stage applied force as determined by FEA.
Figure 16:
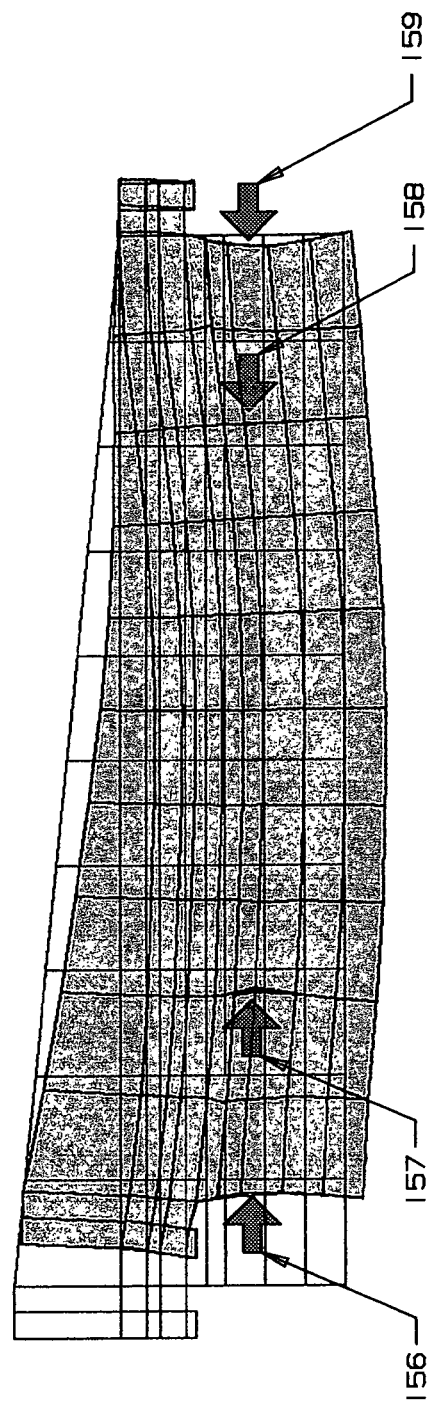
FIG. 16 shows the magnified shape of the forming block with the sag resultant from a 20 percent lower multi-stage applied force as determined by FEA.
Figure 17:
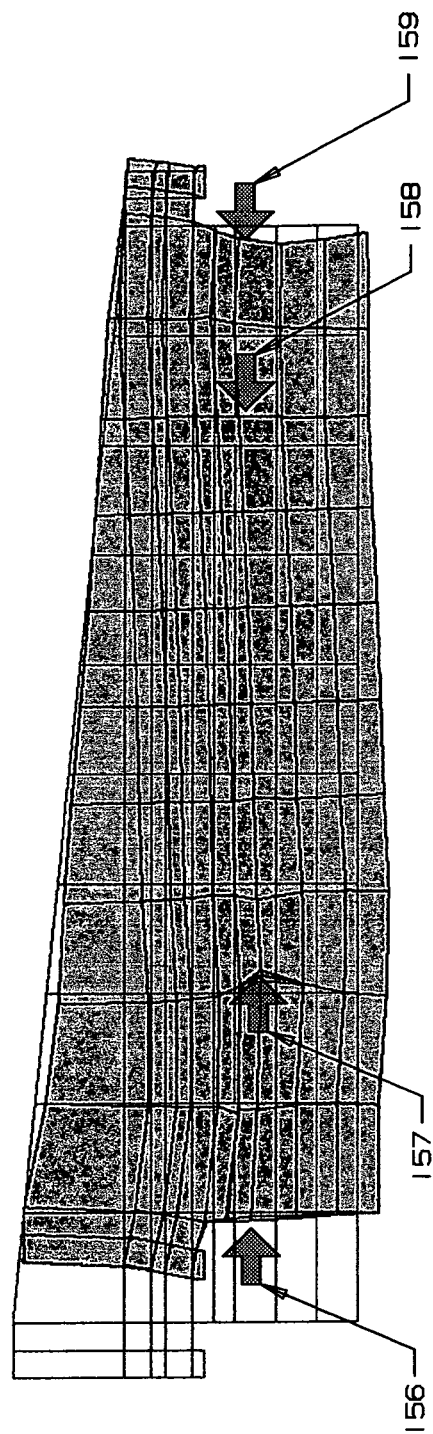
FIG. 17 shows the magnified shape of the forming block with varied inflow end multi-stage applied forces as determined by FEA.
Figure 18:
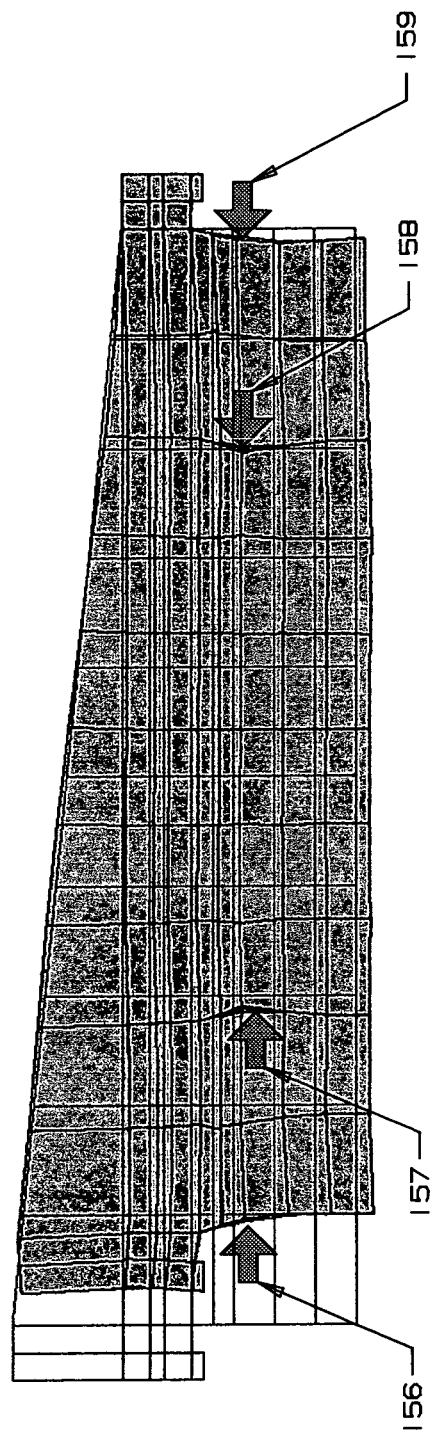
FIG. 18 shows the magnified shape of the forming block with varied far end multi-stage applied forces as determined by FEA.

FIGS. 15, 16, 17, and 18 show various combinations of multi-stage force application and the magnified effect on forming block shape. It can be seen that the sagged shape shown in FIG. 15, which is the result of an FEA, is an improvement over that of the single force sagged shape of FIG. 10. FIGS. 16, 17, and 18 also illustrate the versatility in the shapes that are generated by different combinations of the multi-stage force system. Table 1 gives the force information for FIGS. 15, 16, 17, and 18. The force at each location is given as a percent of the total force at each end, which is the condition of FIG. 15.

TABLE 1

|  | Force 156 | Force 157 | Force 158 | Force 159 |
|---|---|---|---|---|
| FIG. 15 | 40% | 60% | 20% | 80% |
| FIG. 16 | 32% | 48% | 16% | 64% |
| FIG. 17 | 0% | 100% | 20% | 80% |
| FIG. 18 | 40% | 60% | 60% | 40% |

There are other parameters that can be used to effect the sheet thickness distribution besides the shape of the forming block. The most important parameters besides the shape of the forming block are the tilt of the forming block and the temperature distribution of the glass as it flows in the forming block. The temperature distribution of the glass is effected primarily by the radiation to the glass from the silicon carbide enclosure (228) of the forming block (11). For the purpose of the following embodiments it is assumed that the temperature distribution is maintained constant and that the tilt is only used to maintain the average thickness along the length of the sheet constant.

Preferably the design of the forming block and the magnitudes of the applied forces for the campaign start-up configuration of the multi-stage force system and forming block are determined by iterating the design using FEA and CFD. The shape of the forming block may be further verified by an oil model. Comparing the results of CFD and oil modeling enhances the capability of each technology.

There are two important steps in developing the technology to correct the shape of the forming block and thus the sheet thickness distribution during a manufacturing campaign. They are 1) relating forming block shape to variations in sheet thickness distribution and 2) relating applied forces to forming block shape.

Step 1—Relating Forming Block Shape to Variations in Sheet Thickness Distribution In a preferred embodiment, CFD is used to generate a matrix of forming block deformation to sheet thickness deviations from standard. In another preferred embodiment, oil modeling of varied shapes of the forming block is alternately used to generate a matrix of forming block deformation to sheet thickness deviations from standard. When a stationary error in the sheet thickness distribution is evident, either or both of these matrixes is used to estimate the deformed shape of the forming block.

Step 2—Relating Forces to Forming Block Shape

In a preferred embodiment, FEA is used to determine the effect of varied applied forces on the shape of the forming block. The FEA results of varied force combinations of Table 1 are shown in FIGS. 15, 16, 17, and 18. An alternative embodiment uses a physical model of the forming block, whereby the forces are applied to an elastic body of low modulus of elasticity and the deflections measured. A quadratic or higher order equation is fitted to each forming block shape for each force condition. FIGS. 15, 16, 17, and 18 show forming block shape results for various combinations of forces; (156), (157), (158), and (159). In a preferred embodiment, forces (140) and (150) are also included in the analysis.

Correcting Sheet Thickness Distribution During a Manufacturing Campaign

When after a given time period of the production campaign, a stationary error in the sheet thickness distribution is evident, the first step is to use the relationships developed above to determine the root cause of the error. If the physics of the first principles in the initial design did not work, it is best to know why the physics did not work. Correction of a basic design error or operational procedure is the preferred long term solution for the next production campaign.

In a preferred embodiment step 1 (the relationship of forming block shape to variations in sheet thickness distribution) is used to estimate the deformed shape of the forming block. A regression of the equations of step 2 (the relationship of applied forces to forming trough shape) versus the deformed shape of the forming block determines the force errors that produced the forming block deformation. Twice the negative of these force errors would normally produce a corrective action over a similar time period of the production campaign during which the thickness error occurred. It is important to note that the thermal creep deformations occurred over a period of time and that corrective action can only be effective over a similar time period. Also, there are non-linearities in the thermal creep deformation process and therefore small steps and continuous monitoring and analysis of progress is required.

In another preferred embodiment the matrix of step 1 (the relationship of forming block shape to variations in sheet thickness distribution) and the regression equations of step 2 (the relationship of applied forces to forming trough shape) are combined. A regression of this combined set of equations versus the sheet thickness deviations determines the force errors that produced thickness variation in the sheet. Twice the negative of these force errors would normally produce a corrective action over a similar time period of the production campaign during which the thickness error occurred. It is important to note that the thermal creep deformations occurred over a period of time and that corrective action can only be effective over a similar time period. Also, there are non-linearities in the thermal creep deformation process and therefore small steps and continuous monitoring and analysis of progress is required.

The regression analysis may be performed either mathematically or by manual substitution. For matrices and equations that are not fully developed, the mathematical solution often gives erratic results. Manual substitution is often the way to a practical solution.

In summary either of the two procedures above or variations of these procedures, (mathematical, empirical, or a combination of the two) can be used to correct sheet thickness distribution during a manufacturing campaign.

Figure 20:
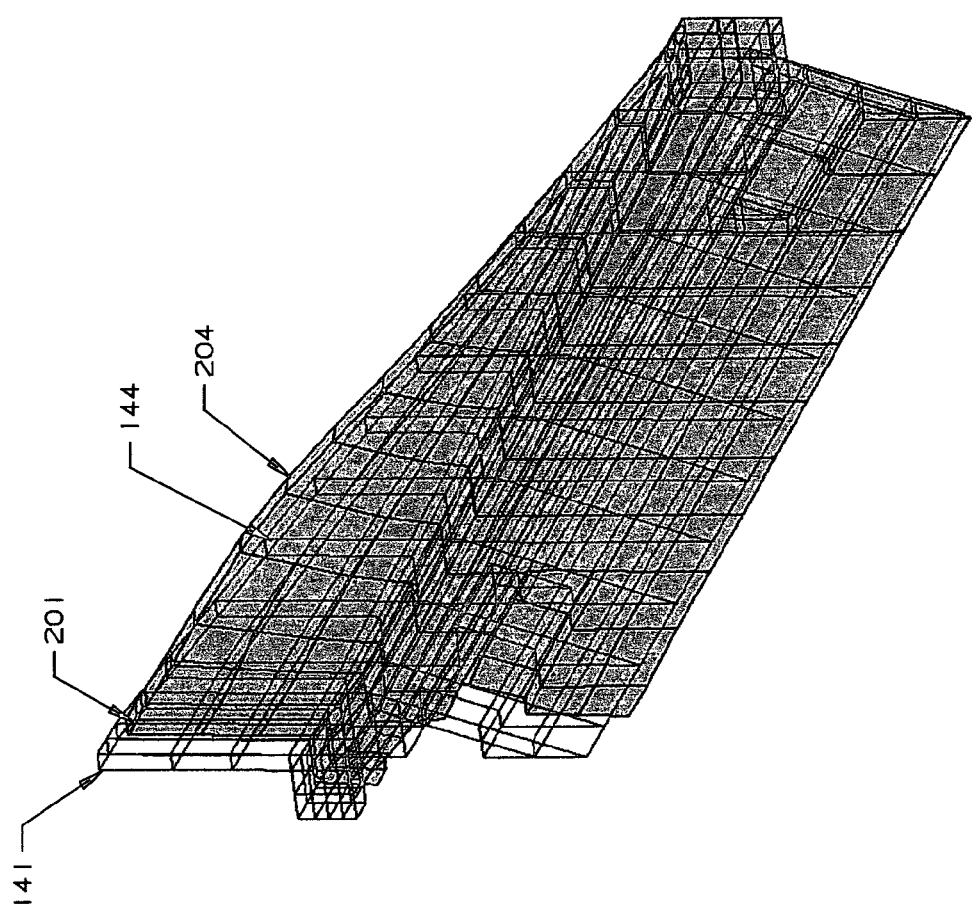
FIG. 20 shows the magnified shape of the forming block trough lateral thermal creep deflection caused by hydrostatic pressure as determined by FEA.

FIG. 20 is an FEA illustration of the effect of hydro-static forces, which cause an additional source of sheet thickness distribution error. A lateral deformation is caused by thermal creep of the forming block trough side-wall and weir, which is not addressed in the prior art. In FIG. 20 the forming block (201) is deformed longitudinally approximately 5 percent from its original shape (141). The weir (204) is deformed from its original position (144) both longitudinally and laterally. This deformation causes additional flow to the center of the glass sheet and a thinning of the sheet at the inflow end. The procedure just discussed above is used to compensate for this phenomenon.

Increase in Production Rate with a Two-Step Process

The refractory material from which the forming block is normally made is isostatically pressed Zircon. A single piece of isostatically pressed Zircon is limited in size by Zircon manufacturing technology. The drawing of the glass sheet from the root of the forming block in the present overflow process occurs at approximately 100,000 poise. U.S. Pat. No. 3,338,696 teaches that the entire forming block would be isothermal at the temperature where the glass at a viscosity of approximately 100,000 poise. Isothermal operation requires a trough in the top of the forming block of dimensions substantially larger than can be accommodated by present Zircon manufacturing technology. In order to make the trough a reasonable size the glass flowing into the forming block trough is at a lower viscosity of approximately 25,000 poise (higher temperature) and then cooled to the forming viscosity of approximately 100,000 poise. The higher the inflow temperature (lower viscosity) the smaller the trough. The greater the difference between the inflow temperature and the forming temperature the greater the cooling requirement, which results in a larger required vertical dimension of the forming block to facilitate the increased cooling requirement. The present single forming block design is thus a compromise.

FIGS. 21A-21B illustrate the principle parts of a typical "Overflow Process" forming system. The molten glass (12) from the melting furnace and forehearth, which must be of substantially uniform temperature and chemical composition, enters the forming apparatus through the inflow pipe (8) and flows into the wedge shaped forming block (11). Straight sloped weirs (84) form each side of a trough at the top of the forming block (11). The trough bottom (86) and the sides of the trough are contoured in a manner to provide even distribution of glass to the top of each side weir (84). The molten glass (12) then flows through the trough in the forming block (11), over the top of each side weir (84), down each side of the wedge shaped forming block (11), and joins at the root (15) to form a sheet of molten glass. The molten glass is then cooled by radiation as it is pulled off the root (15) by pulling rollers (219) to form a solid glass sheet (13) of substantially uniform thickness.

Figures 22A, 22B:
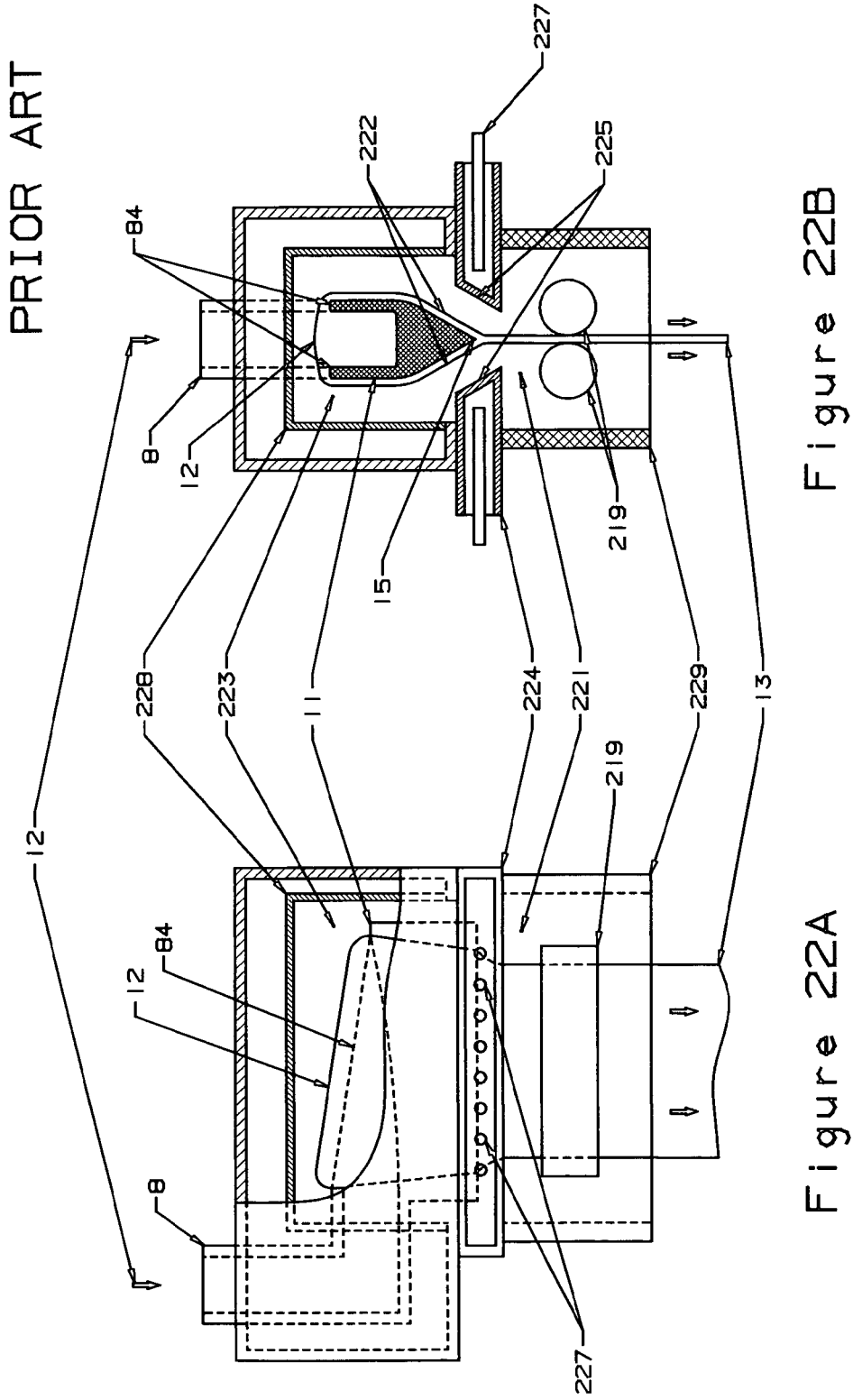
FIG. 22A is a side view of the thermal environment of the prior art glass forming block.
FIG. 22B is an end view of the thermal environment of the prior art glass forming block.

FIGS. 22A-22B show the prior art forming block (11) in a chamber (223) enclosed by a muffle (228). The muffle (228) is preferably made from silicon carbide, a high conductivity material that maintains a suitable temperature distribution for the glass flow to be distributed uniformly to form the glass sheet. Sliding doors (224) at the bottom of the chamber have a surface (225) that is at a lower temperature than the chamber interior and thus provides radiant cooling for the glass (222) on the lower portion of the forming block (11). Cooling air is supplied through individually controlled cooling tubes (227) as taught by U.S. Pat. No. 3,682,609, herein incorporated by reference. These cooling tubes (227) control the longitudinal temperature distribution of the glass forming the sheet (13). The sliding doors (224) are adjustable laterally to control the heat loss from chamber (223) to annealing chamber (221). Below the sliding doors (224) is the annealer (229) which removes the internal stresses in the glass sheet (13). The pulling rollers (219) are normally fabricated as part of the annealer (229) and are contained within the temperature controlled annealing chamber (221).

Figures 23A, 23B:
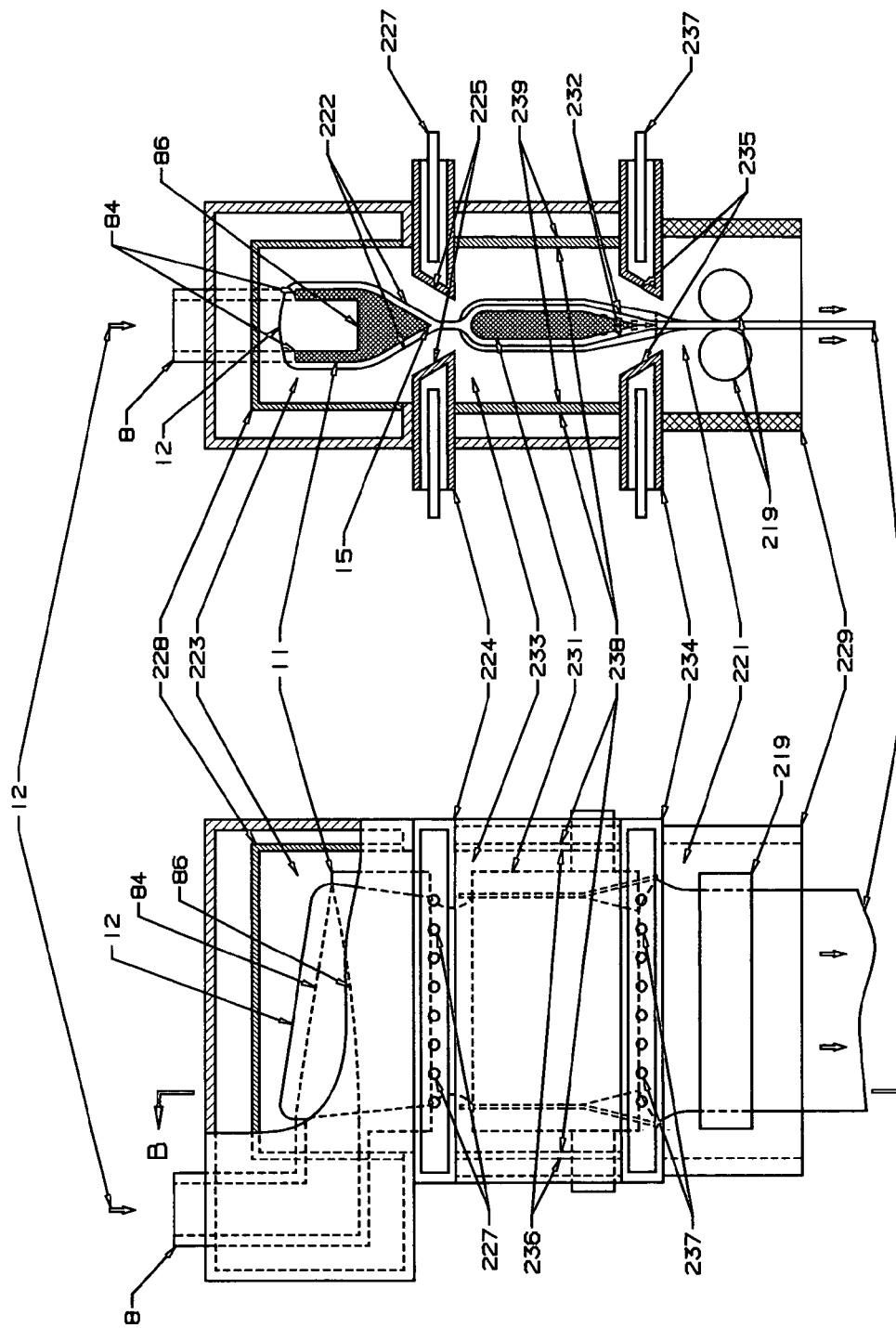
FIG. 23A is a side view of the two step forming process in an embodiment of the present invention.
FIG. 23B is an end view of the two step forming process in an embodiment of the present invention.

FIGS. 23A-23B show a sheet glass forming apparatus which includes a forming block (11) in a temperature controlled chamber (223) feeding glass to a cooling block (231) in another temperature controlled chamber (233) enclosed by muffle (238), which has sidewalls (239) and endwalls (236). In a preferred embodiment of the present invention, the muffle (238) is made from silicon carbide. The temperature of the sidewalls (239) is at or below the temperature of the glass entering the chamber (233). The temperature of the endwalls (236) may be either greater than or less than the sidewall (239) temperature in order to control the temperature of the edges of the flowing glass. In a preferred embodiment the temperature of the endwalls (236) is within 50° C. of the temperature of the sidewalls (239). Both the endwalls (236) and the sidewalls (239) have top to bottom and side to side temperature gradients. The temperature in chamber (233) is substantially lower than that in chamber (223) and thus provides controlled cooling of the glass as it flows down each side of the cooling block. In a preferred embodiment the temperature in chamber (233) is 75° C. to 150° C. lower than the temperature in chamber (223). Sliding doors (234) at the bottom of the chamber (233) have a surface (235) that is at a lower temperature than the chamber interior and thus provides additional radiant cooling for the glass (232) on the lower portion of the cooling block (231). The sliding doors (234) are adjustable laterally to control the heat loss from chamber (233) to annealing chamber (221). The adjustable sliding doors (224) serve the dual purpose of cooling the glass on the prior art forming block (11) and providing thermal isolation between temperature controlled chamber (223) and temperature controlled chamber (233).

It is important to control convective heat transfer at certain critical points in the two step process. Convective heat transfer (via air currents) must be minimized between the glass (222) on the inverted surface of the forming block (11) and the sliding door surface (225) and the glass (232) on the inverted surface of the cooling block (231) and the sliding door surface (235). This is preferably accomplished by equalizing the localized pressure in chambers (223) and (233) at the sliding door (224) and by equalizing the localized pressure in chambers (233) and (221) at the sliding door (234).

The physics of this invention is best described by an example. Table 2 below defines the temperature-viscosity relationship for a typical LCD glass. Assume that the prior art inflow glass temperature is 1255° C. and the forming temperature is 1180° C. This corresponds to an inflow viscosity of 25,000 poise and a forming viscosity of 100,000 poise. The prior art forming block (11) and the cooling from the prior art sliding doors (224) must cool the glass 75° C. If double the production rate is required using the prior art forming block shape the inflow temperature must be 1300° C. which corresponds to halving the viscosity to 12,500 poise, which would double the flow rate of the glass. The forming temperature remains substantially the same, therefore with double the flow rate, the temperature change requirement is now 120° C. This is a required energy loss increase of 320 percent, 200 percent of which is caused by the increased glass flow and 160 percent of which is caused by the increased temperature change (200 percent multiplied by 160 percent equaling 320 percent). In the prior art this would require a much longer cooling zone which would translate to a forming block (11) with a substantially larger vertical dimension and larger sliding doors (224). The present invention adds a second cooling block (231), cooling chamber (233), and additional sliding doors (234). The second cooling block (231) includes a second set of individually controlled cooling tubes (237). Because of the limitation on the size of the Zircon forming block, adding the second cooling block (231), cooling chamber (233), and the additional sliding doors (234) is a practical solution to the energy removal problem.

TABLE 2

| Temperature | Viscosity-poise |
|---|---|
| 1150° C. | 200,000 |
| 1180° C. | 100,000 |
| 1215° C. | 50,000 |
| 1255° C. | 25,000 |
| 1300° C. | 12,500 |

An additional advantage of the separate cooling chamber (233) is that the temperature distribution in chamber (223) may be designed to optimize the function of glass flow distribution, instead of having to be compromised to also perform the cooling function. U.S. Pat. No. 3,338,696 teaches that the chamber (223) surrounding the forming block should be at a uniform temperature. This is possible and/or can be more closely realized if a compromise is not required to cool the glass to the temperature required for drawing.

The temperature distribution in the cooling chamber (233) may be optimized for the cooling function. The drawing temperature of the glass that is used for LCD display devices has a drawing temperature close to the glass devitrification temperature. The devitrification temperature is the temperature at which the glass starts to crystallize, forming non-transparent defects. The separate cooling chamber allows more precise control of glass temperature, thus allowing the operating drawing temperature to more closely approach the devitrification temperature. Lowering the operational drawing temperature also increases the stability of the drawing process.

FIGS. 24A-24B show the cooling block (231) in greater detail. On each end of the cooling block (231) is a fence (241) to which the vertically flowing glass (12) attaches in order to overcome the effect of surface tension. On each end of the bottom of cooling block (231) is an edge director (242) to counter the effect of surface tension of the glass (12) when it is flowing on the inverted surfaces (243) of the cooling block (231). The prior art edge director for the forming block (11) is taught in U.S. Pat. No. 3,451,798, herein incorporated by reference, and may optionally be used in this application. FIG. 24B shows the glass (12) flowing between the forming block (11) and the cooling block (231) a distance (245). If the distance (245) is too great, the glass (12) flow becomes unstable causing entrapment of bubbles, which are rejectable defects. The maximum distance for stable operation is a function of glass (12) flow rate and viscosity. In a preferred embodiment the maximum distance is 50 mm. In another preferred embodiment the distance (245) is zero, where the forming block (11) is in contact with the cooling block (231) at one or more longitudinal locations. FIG. 24A also shows support blocks (248) at each end of the bottom of the cooling block (231). Force (246) is applied to each cooling block to provide a compression stress to counteract thermal creep deformation of the cooling block (231) caused by gravity acting on the weight of the cooling block (231), the weight of the glass flowing on the cooling block (231) and the drawing forces of the sheet below the cooling block (231).

FIGS. 25A-25C are detailed views of the cooling block without the flowing glass (12). The edge director (242) used on the cooling block (231) is a novel improvement of the edge director taught in U.S. Pat. No. 3,451,798 in that the intersection of the filleted surface (252) and the fence (241) is skewed outward away from the center of the cooling block (231) at an angle (254). This skewed angle makes the sheet wider. The filleted surface (252) of the edge director (242) is shown as a plane, but may optionally be concave. It is a combination of the shape of the fillet surface (252) and the skewed angle (254) that make the glass stay attached to the fence (241). The shape of fillet surface and the magnitude of the skew angle may be determined by CFD. It also may be determined and/or verified by modeling prior to implementation in production in an oil model using the Capillary Number as the parameter of similitude between the oil and the glass. The Capillary Number is equal to the Viscosity times the Velocity divided by the Surface Tension.

Glass (12) flowing adjacent to the fences (241) and on the edge director (242) fillet surfaces (252) moves substantially slower than the glass (12) flowing on the body of the cooling block (231). Also, the ends of the cooling block (231) are likely to be colder than the center of the cooling block. The slower movement, the colder environment or a combination of both make the glass (12) more susceptible to devitrification. Localized heating is provided to overcome this problem. FIGS. 25A and 25B show an embodiment of the present invention whereby radiant heaters (257) focused specifically on the edge directors (242) provide localized heating. FIGS. 25A and 25C show an embodiment using electrical resistance heating of the platinum in the edge director (242) and fence (241) to provide localized heating. Electrical conductors (255) and (256) attached to the top and bottom respectively of the edge director (242) are connected to a low voltage/high current electrical power supply. Electric current passing through the platinum heats the edge director (242). The distribution of the heating is controlled by the geometry and thickness distribution of the platinum in the edge director (242). This direct heating technology is used in other applications in the glass industry.

In summary the cooling block embodiment of this invention not only increases the production rate, but also contributes to the controllability of the process and quality of the product.

If edge directors are used on the forming block (11), they also may have an intersection of a filleted surface and a fence skewed outward away from the center of the forming block (11) at an angle, similar to the edge directors (242) for the cooling block (231) in FIG. 25. The shape of the fillet surface and the magnitude of the skew angle for the edge directors on the forming block may be determined by CFD. It also may be determined and/or verified by modeling prior to implementation in production in an oil model using the Capillary Number as the parameter of similitude between the oil and the glass.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A method of supplying a constant flow of glass to a glass forming process using an apparatus comprising a downcomer pipe arranged to receive molten glass flow from an upstream device and configured for controlling the flow of molten glass, a forming block configured to form molten glass into a glass sheet, an inflow pipe configured to receive molten glass flow from the downcomer pipe and deliver the molten glass to the forming block, a first heating element and a second heating element positioned on an outside of the downcomer pipe, a first thermocouple arranged to measure a temperature of a glass stream through the downcomer pipe at an inflow end of the first heating element, a second thermocouple arranged to measure a temperature of the glass stream at an outflow end of the first heating element and at an inflow end of the second heating element, and a third thermocouple arranged to measure a temperature of the glass stream at an outflow end of the second heating element on the downcomer pipe, comprising the steps of:
    a) flowing a stream of molten glass through the apparatus at a mass flow rate;
    b) adding a substantially constant total energy input to the stream of molten glass with the first and second heating elements;
    a) detecting a change in a difference between the temperature of the glass stream measured by the first thermocouple and the temperature measured by the third thermocouple to determine an error in the mass flow rate; and
    b) changing the temperature measured at the second thermocouple by adjusting the respective energy input of the first and second heating elements, while maintaining the total energy input constant such that the mass flow rate is maintained at a substantially constant value.

2. The method of claim 1, further comprising the step of maintaining an outlet temperature of the glass flowing from the downcomer pipe at a fixed value.

3. The method of claim 1, wherein the apparatus further comprises a plurality of cooling zones at a same location on the downcomer pipe as the heating elements.

4. The method of claim 3, further comprising the step of measuring an energy flux from the cooling zones.

5. The method of claim 4, further comprising the step of maintaining the outlet temperature of the glass flowing from the downcomer pipe at a fixed value.

6. The method of claim 1, wherein the thermocouples are immersed in the glass stream.

7. The method of claim 6, wherein molten glass flowing from the forming block produces a glass sheet having at least one unusable bead, and defects caused by a flow of the glass stream in proximity of the thermocouples immersed in the glass stream are located in the at least one unusable bead.

8. A method of supplying a constant flow of glass to a glass forming process using an apparatus comprising a cooling pipe arranged to receive and cool a flowing stream of molten glass from an upstream device, a downcomer pipe for controlling the flow of molten glass, a bowl for connecting the cooling pipe to the downcomer pipe, a forming block configured to form molten glass into a glass sheet, an inflow pipe configured to receive molten glass from the downcomer pipe and deliver the molten glass to the forming block, a first heating element on an outside of the cooling pipe, a second heating element and a third heating element on an outside of the downcomer pipe, a first thermocouple arranged along the cooling pipe to measure a temperature of the glass stream at an inlet end of the first heating element, a second thermocouple arranged along the cooling pipe to measure a temperature of the glass stream at an outlet end of the first heating element, a third thermocouple arranged to measure a temperature of the glass stream at an outflow end of the second heating element and at the inflow end of the third heating element, comprising the steps of:
    a) flowing a stream of molten glass through the apparatus at a mass flow rate;
    b) adding a first substantially constant energy input to the stream of molten glass by the first heating element and adding a second substantially constant total energy input to the stream of molten glass by the second and third heating elements;
    c) detecting a change in a difference between the temperature of the stream of molten glass measured by the first thermocouple and the temperature of the stream of molten glass measured by the second thermocouple to determine an error in the glass stream mass flow rate; and
    b) changing the temperature measured at the third thermocouple by adjusting the respective energy input of the second and third heating elements, while maintaining the second total energy input constant, such that the mass flow rate is maintained at a substantially constant value.

9. The method of claim 8, further comprising the step of maintaining an outlet temperature of the glass exiting the downcomer pipe at a fixed value.

10. The method of claim 8, wherein the apparatus further comprises a plurality of cooling zones at a same location as the first heating element, the second heating element, and the third heating element.

11. The method of claim 10, further comprising the step of measuring an energy flux from the cooling zones.

12. The method of claim 11, further comprising the step of maintaining the outlet temperature of the glass flowing from the downcomer pipe at a fixed value.

13. The method of claim 8, wherein the thermocouples are immersed in the glass stream.

14. The method of claim 13, wherein molten glass flowing from the forming block produces a glass sheet having at least one unusable bead, and defects caused by a flow of the glass stream in proximity of the thermocouples immersed in the glass stream are located in the at least one unusable bead.

\* \* \* \* \*